United States Patent
da Silva et al.

(10) Patent No.: US 8,369,468 B2
(45) Date of Patent: Feb. 5, 2013

(54) TENSOR-BASED RECEIVER FOR SEPARATING COMPONENT SIGNALS IN A COMPOSITE SIGNAL

(75) Inventors: Icaro L. J. da Silva, Stockholm (SE); Robert Baldemair, Solna (SE); Fco. Rodrigo P. Cavalcanti, Fortaleza (BR); André L. F. de Almeida, Fortaleza (BR); Sorour Falahati, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 285 days.

(21) Appl. No.: 12/917,126

(22) Filed: Nov. 1, 2010

(65) Prior Publication Data

US 2011/0128997 A1 Jun. 2, 2011

Related U.S. Application Data

(60) Provisional application No. 61/265,463, filed on Dec. 1, 2009, provisional application No. 61/351,160, filed on Jun. 3, 2010.

(51) Int. Cl.
*H04B 7/10* (2006.01)

(52) U.S. Cl. ........................................ 375/347; 374/148

(58) Field of Classification Search .................. 375/347, 375/148, 144
See application file for complete search history.

(56) References Cited

PUBLICATIONS

3rd Generation Partnership Project. 3GPP TS 36.211, V8.4.0 (Sep. 2008). 3rd Generation Partnership Project; Technical Specification Group Radio Access Network; Evolved Universal Terrestrial Radio Access (E-UTRA); Physical Channels and Modulation (Release 8). Sep. 2008.
3rd Generation Partnership Project. 3GPP TS 36.101, V8.4.0 (Dec. 2008). 3rd Generation Partnership Project; Technical Specification Group Radio Access Network; Evolved Universal Terrestrial Radio Access (E-UTRA); User Equipment (UE) radio transmission and reception (Release 8). Dec. 2008.
3rd Generation Partnership Project. "Transmit Diversity for PUCCH in LTE-A." 3GPP TSG-RAN WG1#54, R1-083159, Jeju Island, Korea, Aug. 18-22, 2008.
3rd Generation Partnership Project. "The Gain of the Transmit Diversity for PUCCH in LTE-A." 3GPP TSG-RAN WG1#55, R1-084488, Prague, Czech Republic, Nov. 10-14, 2008.
3rd Generation Partnership Project. "PUCCH Transmit Diversity." 3GPP TSG-RAN WG1 #57bis, R1-092711, Los Angeles, USA, Jun. 29-Jul. 3, 2009.
Nion, D. et al. "A Tensor-Based Blind DS-CDMA Receiver using Simultaneous Matrix Diagonalization." IEEE 8th Workshop on Signal Processing Advances in Wireless Communications, 2007 (SPAWC 2007), Helsinki, Finland, Jun. 17-20, 2007.

(Continued)

*Primary Examiner* — Kevin Kim
(74) *Attorney, Agent, or Firm* — Coats & Bennett, P.L.L.C.

(57) ABSTRACT

A receiver separates multiple component signals carried in a composite signal that have been spread over time and frequency. Multiple diversity branches receive the composite signal. A tensor generation circuit arranges samples of that signal along time, frequency, and diversity dimensions to obtain a composite signal tensor. A set of cascaded least squares estimators then separates the component signals by fitting a constrained tensor model of the composite signal to the composite signal tensor in an alternating least squares estimation process, alternating during any given iteration of the process between fitting different unfolded representations of the constrained tensor model to corresponding unfolded representations of the composite signal tensor. The tensor model models the composite signal as a linear combination of rank-one tensors associated with the component signals, and is constrained in the sense that each rank-one tensor remains constrained according to the spreading of its associated component signal over time.

28 Claims, 8 Drawing Sheets

PUBLICATIONS

Sidiropoulos, N. D. et al. "Blink PARAFAC Receivers for DS-CDMA Systems." IEEE Transactions on Signal Processing, vol. 8, No. 3, Mar. 2000.

De Baynast, A. et al. "Blind PARAFAC Receivers for Multiple Access-Multiple Antenna Systems." 2003 IEEE 58th Vehicular Technology Conference (VTC 2003-Fall), Houston, TX, USA, Oct. 6-9, 2003.

De Almeida, A. L. et al. "Constrained Tensor Modeling Approach to Blind Multiple-Antenna CDMA Schemes." IEEE Transactions on Signal Processing, vol. 56, No. 6, Jun. 2008.

Sidiropoulos, N. D. "Low-Rank Decomposition of Multi-Way Arrays: A Signal Processing Perspective." Sensor Array and Multichannel Signal Processing Workshop Proceedings, Crete, Greece, Jul. 18-21, 2004.

Kolda, T. G. et al. "Tensor Decompositions and Applications." SIAM J. Matrix Anal. Appl., vol. 51, No. 3, pp. 455-500, 2009.

Lee, J. et al. "MIMO Technologies in 3GPP LTE and LTE-Advanced." EURASIP Journal on Wireless Communications and Networking, Hindawi Publishing Corporation, vol. 2009, Article ID 302092, 10 pages, May 2009.

Harshman, R. A. "Foundations of the Parafac Procedure: Models and Conditions for an 'Explanatory' Multimodal Factor Analysis." UCLA Working Papers in Phonetics, vol. 16, pp. 1-84, Dec. 1970.

De Almeida et al., "PARAFAC-based Unified Tensor Modeling for Wireless Communication Systems with Application to Blind Multiuser Equalization," Signal Processing, vol. 87, No. 2, pp. 337-351, Oct. 24, 2006, Amsterdam, NL.

De Almeida A L et al., "Space-Time Multiplexing Codes; A Tensor Modeling Approach," 2006 IEEE 7th Workshop on Signal Processing Advances in Wireless Communications, p. 5, Jul. 2-5, 2006, IEEE Piscataway, NJ.

De Almeida A L et al., "Tensor-Based Space-Time Multiplexing Codes for MIMO-OFDM Systems with Blind Detection," 2006 IEEE 17th International Symposium on Personal, Indoor and Mobile Radio Communications, p. 5PP, 2006, IEEE Piscataway, NJ.

Da Silva I L J et al., "A New Multi-User Receiver for PUCCH LTE Format 1," 2010 IEEE Eleventh International International Workshop on Signal Processing Advances in Wireless Communications (SPAWC), Jun. 20, 2011, pp. 1-5, IEEE Piscataway, NJ.

Da Silva I L J et al., "Improved Data-Aided Channel Estimation in LTE PUCCH Using a Tensor Modeling Approach," 2010 IEEE International Conference on Communications (ICC), May 23, 2010, pp. 1-5, IEEE Piscataway, NJ.

Da Silva et al., "A Multi-User Receiver for PUCCH LTE Format 1 in Non-Cooperative Multi-Cell Architectures," 2010 IEEE 72nd Vehicular Technology Conference Fall (VTC 2010-Fall), Sep. 6, 2010, pp. 1-5, IEEE Piscataway, NJ.

TENSOR-BASED RECEIVER FOR SEPARATING COMPONENT SIGNALS IN A COMPOSITE SIGNAL

RELATED APPLICATIONS

This application claims priority to U.S. Provisional Patent Application Ser. No. 61/265,463, titled "Multi-User Receiver for Inter-Cell Interference Reduction in PUCCH LTE," filed 1 Dec. 2009, and U.S. Provisional Patent Application Ser. No. 61/351,160, titled "Tensor-based Receiver for PUCCH (TREP) LTE-Format 1," filed 3 Jun. 2010, both of which are incorporated herein by reference in their entirety.

TECHNICAL FIELD

The present invention generally relates to receivers in a wireless communication system, and particularly relates to receivers for separating multiple component signals that have been spread over time and frequency.

BACKGROUND

A receiver in a wireless communication system often receives a composite signal that carries multiple, component signals. Some of those component signals may be signals of interest, while others may be interfering signals. As one example, many mobile terminals ("users") in a cell simultaneously transmit signals of interest to a supporting base station. That base station receives all of these signals of interest, along with any number of interfering signals (e.g., from other cells), together as a composite signal.

Since the receiver receives all of the signals together as a composite signal, the receiver must attempt to separate the component signals from one another in order to recover the signals of interest. Some circumstances significantly impair the receiver's ability to fully separate the component signals. Severe channel conditions, for example, can destroy any orthogonality that may have otherwise existed among the signals of interest. Also, orthogonality between the signals of interest and the interfering signals may not even be possible.

The receiver of a base station in Long Term Evolution (LTE) systems often experiences circumstances like these when attempting to separate control signals received from mobile terminals on the Physical Uplink Control Channel (PUCCH). More particularly, mobile terminals sometimes transmit Hybrid-Automatic Repeat Request (HARQ) acknowledgments (ACK or NACK) and scheduling requests to their supporting base station over the PUCCH. Different terminals can share the same physical resources allocated to the PUCCH, but can be separated through spreading of their respective control signals over time and frequency.

In the frequency-domain, each terminal's control signal is spread with a cell-specific base sequence that has been phase rotated in any number of ways. Terminals using different phase rotations of the same cell-specific base sequence can thus be separated through spreading over frequency. Terminals using the same phase rotation can be separated through spreading over time instead. In this regard, each of the terminals' control signals is spread with a different time-domain cover sequence.

Severe channel conditions destroy orthogonality attained from different phase rotations, and likewise destroy orthogonality attained from different cover sequences. This loss of orthogonality causes intra-cell interference between the terminals' control signals and thus seriously impairs the base station's ability to separate those signals from one another.

Moreover, the cell-specific base sequences used by terminals in one cell are not orthogonal to the cell-specific base sequences used by terminals in a neighboring cell, even under ideal channel conditions. This causes inter-cell interference between terminals transmitting control signals in different cells and thus impairs a base station's ability to separate those signals from one another.

Known approaches to mitigate interference on the PUCCH include randomizing the interference through time-hopping. The particular phase rotation used by a terminal varies on a symbol-by-symbol basis. Also, the particular time-domain cover sequence and/or base sequence used by a terminal varies on a time-slot basis. While time-hopping significantly reduces interference on the PUCCH, some interference still remains on the PUCCH.

SUMMARY

Teachings herein separate component signals that are carried in a received composite signal and that have been spread over time and frequency. The teachings utilize a constrained tensor model of the composite signal that advantageously exploits the correlation of each component signal over time in order to fit the model to the received signal. Fitting the constrained model to the received signal in this way mitigates interference, particularly in LTE-based embodiments where the component signals are uplink control signals on the PUCCH.

In one or more embodiments, for example, a receiver configured to separate the component signals of a received composite signal includes multiple diversity branches, a tensor generation circuit, and a set of cascaded least squares (LS) estimators. The multiple diversity branches receive the composite signal over a wireless channel. Having received the composite signal in this way, the tensor generation circuit arranges samples of the composite signal along time, frequency, and diversity dimensions to obtain a composite signal tensor.

The set of cascaded least squares estimators correspondingly accepts as input the composite signal tensor (or different unfolded representations thereof). The set also accepts a constrained tensor model of the composite signal. This model models the composite signal as a linear combination of multiple rank-one tensors associated respectively with the multiple component signals. The model is constrained in the sense that each of the rank-one tensors composing the model is constrained according to the spreading of the associated component signal over time.

Given the composite signal tensor and the constrained tensor model, the set of LS estimators separates the component signals by fitting the constrained tensor model to the composite signal tensor in an alternating least squares estimation process. This entails alternating during any given iteration of the process between fitting different unfolded representations of the constrained tensor model to corresponding unfolded representations of the composite signal tensor. The fit of the constrained tensor model to the composite signal tensor improves at each iteration of the estimation process, and converges to simultaneously produces LS estimates for each of the component signals carried by the composite signal.

In some embodiments, for example, the component signals are spread with a common time-domain spreading pattern. In this case, respective modulation symbols of the component signals are correlated in the sense that they have the same density and distribution in time. Accordingly, each rank-one tensor of the tensor model in these embodiments remains constrained according to the common time-domain spreading pattern.

In so-called single-cell embodiments, the receiver is associated with the base station of a particular cell and is concerned only with the component signals received from mobile terminals supported by the base station. Since the base station supports these terminals, the receiver has knowledge of frequency-domain spreading sequences with which the terminals spread the component signals and need not estimate those spreading sequences.

In other so-called multi-cell embodiments, the receiver is concerned not only with desired component signals received from terminals supported by the base station, but also interfering component signals from terminals in other cells that are not supported. In this case, the receiver in various "cooperative" embodiments is cooperatively connected to receivers of other cells, e.g., via a common base station controller, for exchanging control information. In particular, the receiver receives control signaling from the other cells that indicates the number of interfering component signals and the frequency-domain spreading sequences used to spread those signals. This way, the receiver again has knowledge of frequency-domain spreading sequences and need not estimate those spreading sequences.

In "non-cooperative" embodiments, the receiver only knows the frequency-domain spreading sequences for the terminals its base station supports and must estimate spreading sequences of terminals its base station does not support. This may entail, for example, estimating the rank of the composite signal tensor to determine the number of interfering component signals and then estimating the associated spreading sequences.

In still further embodiments, each component signal of the received composite signal has been spread with time-domain spreading sequences, frequency-domain spreading sequences, or both that vary over time according to a time-hopping pattern. Such time-hopping may be on a time-slot basis, or where the signals comprise Orthogonal Frequency Domain Multiplexing (OFDM) signals on an OFDM symbol-basis. In either case, though, each rank-one tensor of the tensor model is constrained according to this time-hopping pattern.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
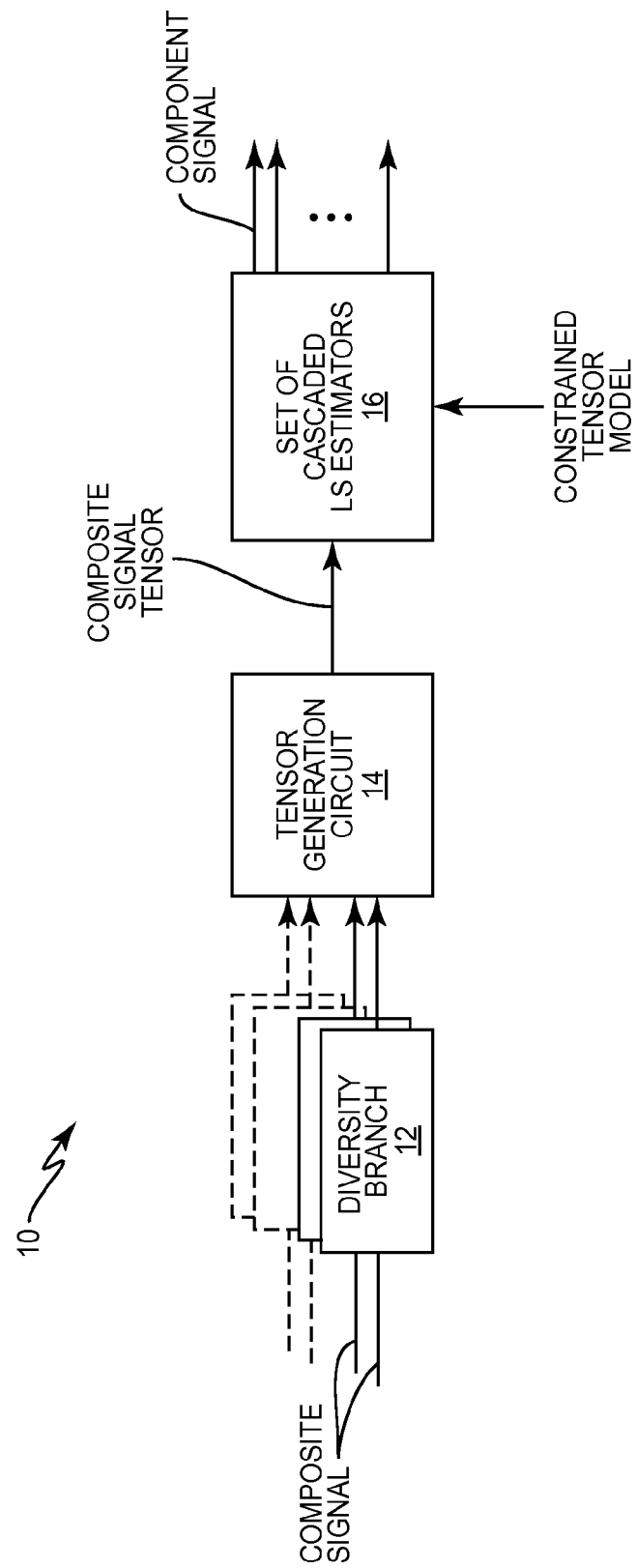
FIG. 1 is a block diagram of a receiver configured to separate multiple component signals carried in a composite signal according to some embodiments.

FIG. 1 illustrates a receiver 10 configured to separate multiple component signals that are carried in a composite signal and that have been spread over time and frequency. The receiver 10 includes multiple diversity branches 12, a tensor generation circuit 14, and a set 16 of cascaded least squares estimators.

The multiple diversity branches 12 are configured to receive the composite signal over a wireless channel. In some embodiments, the diversity branches 12 exploit spatial diversity and thereby receive multiple copies of the composite signal over multiple antennas. In other embodiments, the diversity branches 12 exploit temporal diversity and receive multiple copies of the composite signal over multiple time slots.

The tensor generation circuit 14 is configured to arrange samples of the composite signal along time, frequency, and diversity dimensions to obtain a composite signal tensor. The tensor generation circuit 14 may, for example, receive samples in time from each diversity branch 12, and then convert those time samples into the frequency domain using Fourier processing. With both time and frequency samples for each diversity branch, the tensor generation circuit 14 builds the composite signal tensor by stacking the samples along the three dimensions—time, frequency, and diversity (e.g., spatial). In some embodiments (like the one shown in FIG. 1), the tensor generation circuit 14 simply outputs the composite signal tensor to the set 16 of cascaded least square estimators; in other embodiments, the circuit 14 instead outputs different unfolded representations of the composite signal tensor, for use by the set 16 of estimators as described below.

The set 16 of cascaded least squares estimators is correspondingly configured to accept as input the composite signal tensor (or the different unfolded representations thereof). The set 16 is also configured to accept a constrained tensor model of the composite signal. This model models the composite signal as a linear combination of multiple rank-one tensors associated respectively with the multiple component signals. The model is constrained in the sense that each of the rank-one tensors composing the model is constrained according to the spreading of the associated component signal over time.

Given the composite signal tensor and the constrained tensor model, the set 16 of cascaded least squares estimators is configured to separate the component signals by fitting the constrained tensor model to the composite signal tensor in an alternating least squares (LS) estimation process. As explained in more detail below, this alternating LS estimation process entails alternating during any given iteration of the process between fitting different unfolded representations of the constrained tensor model to corresponding unfolded representations of the composite signal tensor.

The fit of the constrained tensor model to the composite signal tensor thus improves at each iteration of the estimation process. Once the estimation process converges to the fit that minimizes the error of the model (or proceeds for some pre-determined number of iterations), the process simultaneously produces LS estimates for each of the component signals carried by the composite signal. As the error of the model is minimized, the separation between the estimated component signals is maximized. This significantly reduces interference between the component signals as compared to known approaches, especially when severe channel conditions or the like threaten the orthogonality of those signals.

The particular constraint(s) imposed upon the constrained tensor model of the composite signal may depend upon the particular manner in which the component signals have been spread in time. In this regard, note a distinction between a spreading pattern and a spreading sequence. A spreading sequence defines the particular coefficients used to spread a signal. A spreading pattern by contrast defines how many and over which particular time slots or units the signal is spread (i.e., the density and distribution of the signal over time).

In some embodiments, the component signals are spread with a common time-domain spreading pattern. In this case, respective modulation symbols of the component signals are correlated in the sense that they have the same density and distribution in time, irrespective of whether they are spread with the same time-domain spreading sequence. Accordingly, each rank-one tensor of the tensor model in these embodiments remains constrained according to the common time-domain spreading pattern.

In other embodiments, the component signals are also spread with a common time-domain spreading sequence. In this case, the component signals are separated only through spreading in the frequency-domain, meaning that respective modulation symbols of the signals have the same density and distribution in time and have been spread using the same spreading coefficients. Each rank-one tensor of the tensor model in these embodiments remains constrained according to both the common time-domain spreading pattern and the common time-domain spreading sequence.

Figure 2A:
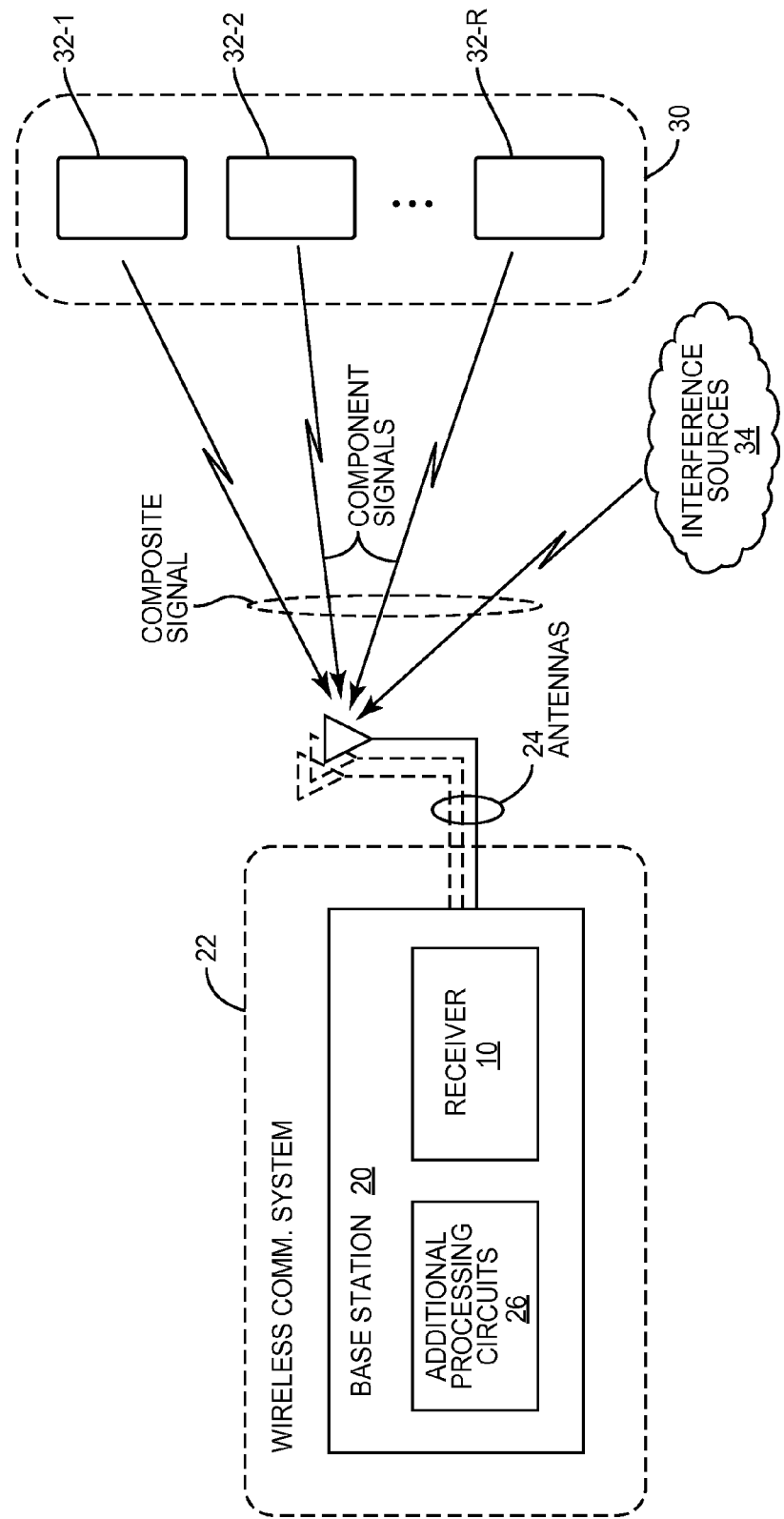
FIGS. 2A-2B are block diagrams of a base station that includes the receiver of FIG. 1, according to various different embodiments.
Figure 2B:
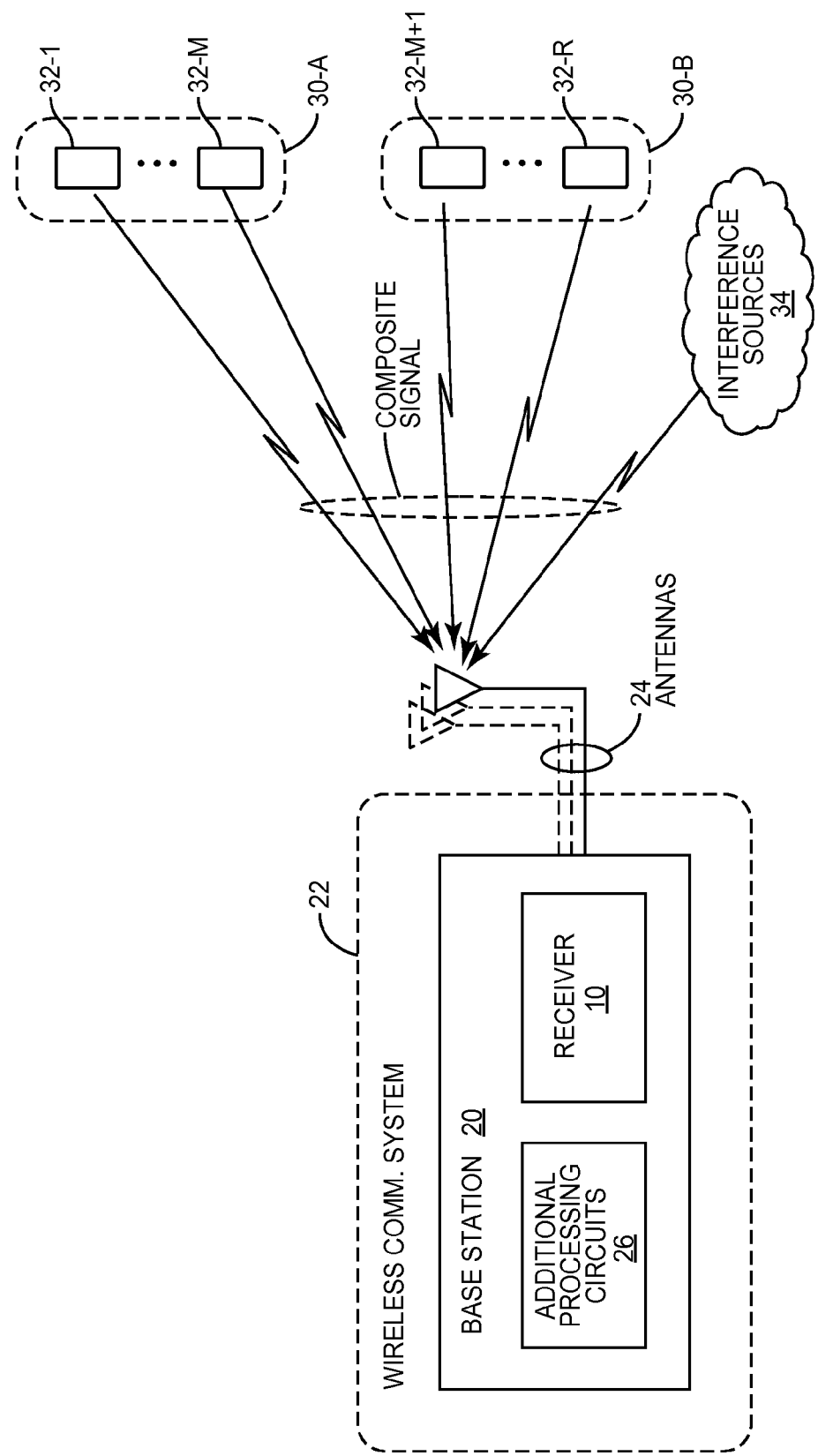

FIGS. 2A-2B helps illustrate the embodiments above using non-limiting examples where the receiver 10 is the receiver of a base station 20 in a Long Term Evolution (LTE) wireless communication system 22. The base station 20 supports radio signal coverage for a group 30 of mobile terminals 32 geographically located in one or more service regions, e.g., cells or sectors. The mobile terminals 32 transmit individual uplink control signals to the base station 20 over the Physical Uplink Control Channel (PUCCH). The control signals transmit Hybrid-Automatic Repeat Request (HARQ) acknowledgments (ACK or NACK) and scheduling requests to the base station 20, along with a reference signal. All terminals 32 within group 30 transmit using the same physical resources of the PUCCH, but are separated through spreading of their respective control signals.

In FIG. 2A, the terminals 32 within group 30 are separated only through spreading of their control signals over frequency. That is, the control signals are spread with both a common time-domain spreading pattern and a common time-domain spreading sequence, but are spread with different frequency-domain spreading sequences. In this case, one or more antennas 24 at the base station 20 receive all of the control signals from the group 30 of terminals 32 as a composite signal, with each individual control signal being one component of that composite signal. The composite signal may also include component signals from various interfering sources 34, e.g., uplink control signals from mobile terminals in other cells that are not supported by the base station 20.

The receiver 10 is configured to simultaneously separate all of these component signals of the composite signal as described above, in order to recover the individual control signals from mobile terminals 32. In particular, the receiver 10 employs a tensor model of the composite signal that constrains each rank-one tensor of the model according to both the common time-domain spreading pattern and the common time-domain spreading sequence used by the group 30 of terminals 32.

In FIG. 2B, the terminals 32 within group 30 are separated through spreading of their control signals over both time and frequency. In this case, all of the terminals may still spread their control signals with a common time-domain spreading pattern, but different subgroups 30A, 30B of terminals 32 spread their control signals with different time-domain spreading sequences. Terminals 32 within any given subgroup 30A, 30B separate themselves from one another by spreading their control signals with different frequency-domain spreading sequences.

The receiver 10 in FIG. 2B is also configured to simultaneously separate all of the component signals of the composite signal. In this case, though, the receiver 10 employs a tensor model of the composite signal that constrains each rank-one tensor of the model according to the common time-domain spreading pattern used by the group 30 of terminals 32. As there is no time-domain spreading sequence common to the group 30 of terminals 32, each rank-one tensor of the model is of course not constrained according to such a sequence.

Figure 3:
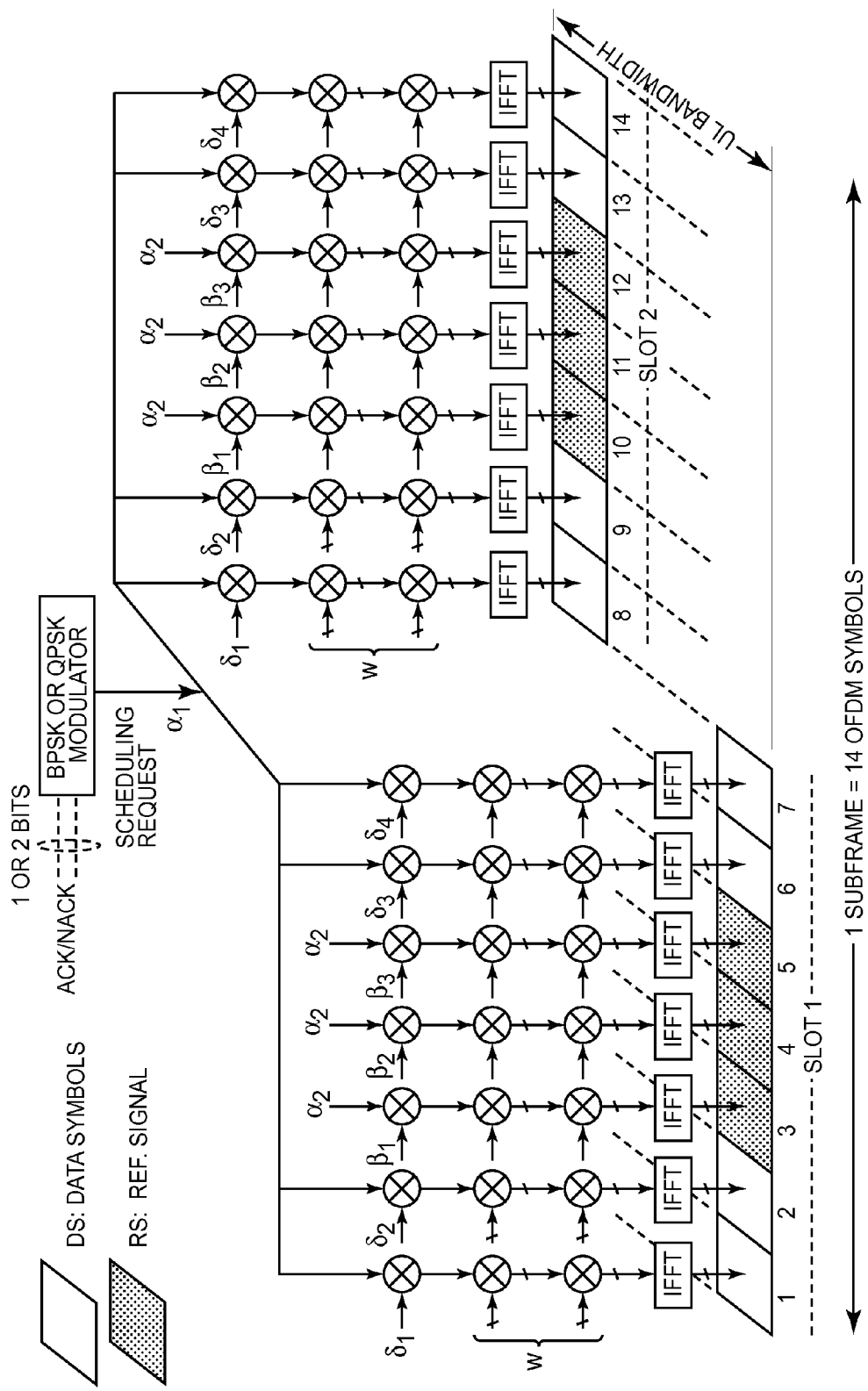
FIG. 3 illustrates the structure of the Physical Uplink Control Channel in Long Term Evolution systems according to various embodiments.

FIG. 3 illustrates additional details concerning the spreading of the control signals on the PUCCH, and provides a basis for a more quantitative understanding of the above embodiments. As FIG. 3 shows, a physical resource allocated to the PUCCH consists of 2 LTE resource blocks (RBs) that are hopped in frequency across the uplink bandwidth. Each RB comprises P=12 subcarriers over 1 time slot. Each time slot then consists of N=7 OFDM symbols as shown for normal Cyclic Prefix (CP), although in other embodiments where an extended CP is used a time slot consists of only N=6 OFDM symbols.

The mobile terminals 32 in the group 30 share the physical resources on the PUCCH to each transmit a HARQ acknowledgement (either an ACK or NACK), a scheduling request (SR), and a reference signal (RS). A HARQ acknowledgement for any given mobile terminal 32 consists of one or two bits converted into one Binary Phase-Shift Keying (BPSK)/Quadrature Phase Shift Key (QPSK) symbol, denoted by $a_1$. The RS is denoted by $a_2$. Unlike HARQ acknowledgements, no explicit information bit is transmitted for a SR; information is instead conveyed by the presence (or absence) of energy on the corresponding PUCCH. Hence, the BPSK/QPSK symbol is replaced by a constellation point treated as negative acknowledgement at the base station 20. If no valid downlink-related control signaling was detected, then nothing is transmitted on the PUCCH (i.e., Discontinuous Transmission Duplex (DTX)). This allows the base station 20 to do three-state detection: ACK, NACK, or DTX on the PUCCH.

The BPSK/QPSK symbol $a_1$ associated with the ACK/NACK of a terminal 32 is spread over 4 out of the N=7 OFDM symbols in each slot using a length-4 time-domain spreading sequence denoted by $\delta=[\delta_1,\delta_2,\delta_3,\delta_4]$. In the same manner, the symbol $a_2$ for the RS is spread over 3 out of the N=7 OFDM symbols in each slot using a length-3 time domain spreading sequence denoted by $\beta=[\beta_1,\beta_2,\beta_3]$ (although in embodiments for extended CP, the RS is spread over only 2 OFDM symbols rather than 3). These sequences may be, for example, a Walsh sequence of length 4 and a Discrete Fourier Transform (DFT) sequence of length 3. The modulation symbols $s_1 \ldots s_N$ that compose the N=7 OFDM symbols transmitted in each time slot may thus be represented in a vector s:

$$s = \begin{bmatrix} s_1 \\ s_2 \\ s_3 \\ s_4 \\ s_5 \\ s_6 \\ s_7 \end{bmatrix} = \begin{bmatrix} \delta_1 a_1 \\ \delta_2 a_1 \\ \beta_1 a_2 \\ \beta_2 a_2 \\ \beta_3 a_2 \\ \delta_3 a_1 \\ \delta_4 a_1 \end{bmatrix} \in \mathbb{C}^{N \times 1}. \quad (1)$$

Each of the modulation symbols $s_n$ is also spread over PUCCH subcarriers using a length-12 frequency-domain spreading sequence denoted by $w=[w_1, \ldots, w_P]$. This spreading sequence $w=[w_1, \ldots, w_P]$ consists of a cell-specific base sequence $b=[b_1, \ldots, b_P]$ that is respectively phase rotated by $e^{j\alpha.0}, \ldots, e^{j\alpha.(P-1)}$, such that:

$$w = \begin{bmatrix} w_1 \\ w_2 \\ \vdots \\ w_P \end{bmatrix} = \begin{bmatrix} b_1 e^{j\alpha.0} \\ b_2 e^{j\alpha.1} \\ \vdots \\ b_P e^{j\alpha.(P-1)} \end{bmatrix} \in \mathbb{C}^{P \times 1}, \quad (2)$$

where $\alpha_{r_q} = 2r_q \cdot \pi/6$, with $r_q = 0, \ldots, 5$ are the phase rotations.

The signal transmitted on the PUCCH in any given time slot can thus be represented by the outer product of the vectors s and w:

$$s \circ w = s w^T = \begin{bmatrix} s_1 \\ \vdots \\ s_N \end{bmatrix} [w_1 \cdots w_P] = \begin{bmatrix} s_1 w_1 & s_1 w_2 & \cdots & s_1 w_P \\ s_2 w_1 & s_2 w_2 & \cdots & s_2 w_P \\ \vdots & \vdots & \ddots & \vdots \\ s_N w_1 & s_N w_2 & \cdots & s_N w_P \end{bmatrix} \in \mathbb{C}^{N \times P}, \quad (3)$$

or in scalar notation $[s \circ w]_{n,p} = s_n w_p$. Note that the resulting matrix has rank one since all columns are linearly dependent.

At the base station 20, the signal on the PUCCH is received over multiple diversity branches associated with multiple receive antennas, multiple time slots, or, as assumed here, both. In embodiments where the base station 20 has two receive antennas 24 and the signal is received over two time slots, the number of diversity branches K=4. Assuming the channel is non time-varying over any given time slot, and that the channel is highly correlated across subcarriers in that time slot, $h_1$ and $h_2$ may represent the two spatial coefficients associated with the first time slot and, $h_3$ and $h_4$ may represent the two spatial coefficients associated with the second time slot. The channel coefficients associated with the two receive antennas and both slots may then be represented in a channel vector h:

$$h = \begin{bmatrix} h_1 \\ h_2 \\ h_3 \\ h_4 \end{bmatrix} \in \mathbb{C}^{K \times 1}. \quad (4)$$

The signal received on the PUCCH from any given terminal 32 absent noise can thus be represented by the outer product of the vectors s, w, and h:

$$X = s \circ w \circ h, \quad (5)$$

or in scalar notation $[X]_{n,p,k} = s_n w_p h_k$. The result is an N×P×K third-order tensor of rank one, where the rank of a tensor is the minimum number of rank-one tensors necessary to express c in a linear combination.

By extension, when all R terminals 32 within group 30 are considered, the signal received on the PUCCH absent noise can be considered as the linear combination of R tensors of rank one, i.e.:

$$X = \sum_{r=1}^{R} s^{(r)} \circ w^{(r)} \circ h^{(r)} = \sum_{r=1}^{R} X^{(r)} \quad (6)$$

where $X^{(r)}$ represents the signal associated with the r-th terminal 32, and where $$s^{(r)} = \begin{bmatrix} s_1^{(r)} \\ s_2^{(r)} \\ s_3^{(r)} \\ s_4^{(r)} \\ s_5^{(r)} \\ s_6^{(r)} \\ s_7^{(r)} \end{bmatrix} \in \mathbb{C}^{7 \times 1}, \; w^{(r)} = \begin{bmatrix} w_1^{(r)} \\ w_2^{(r)} \\ \vdots \\ w_{12}^{(r)} \end{bmatrix} \in \mathbb{C}^{12 \times 1} \text{ and } h^{(r)} = \begin{bmatrix} h_1^{(r)} \\ h_2^{(r)} \\ h_3^{(r)} \\ h_4^{(r)} \end{bmatrix} \in \mathbb{C}^{4 \times 1}$$

are the system parameters associated with the r-th UE. When noise is considered, the noisy received signal Y is:

$$Y = X + V = \sum_{r=1}^{R} X^{(r)} + V = \sum_{r=1}^{R} s^{(r)} \circ w^{(r)} \circ h^{(r)} + V, \quad (7)$$

where V is an N×P×K third-order tensor associated with noise.

Embodiments herein advantageously exploit the correlation of the modulation symbols $s_n$ over time in order to separate the signals associated with the R terminals. In particular, such embodiments recognize that the symbol vector s for any given terminal 32 in equation (1) can be factored:

$$s = \begin{bmatrix} \delta_1 a_1 \\ \delta_2 a_1 \\ \beta_1 a_2 \\ \beta_2 a_2 \\ \beta_3 a_2 \\ \delta_3 a_1 \\ \delta_4 a_1 \end{bmatrix} = \begin{bmatrix} \delta_1 & 0 \\ \delta_2 & 0 \\ 0 & \beta_1 \\ 0 & \beta_2 \\ 0 & \beta_3 \\ \delta_3 & 0 \\ \delta_4 & 0 \end{bmatrix} \begin{bmatrix} a_1 \\ a_2 \end{bmatrix} = \Theta a., \quad (8)$$

where $\Theta$ represents a so-called time spreading matrix and $a=[a_1 \, a_2]^T$ represents a so-called effective symbol vector that contains the modulation symbols $a_1$ and $a_2$. Generally, the time spreading matrix $\Theta$ models the correlation of the modulation symbols $a_1$ and $a_2$ over time. More specifically, the time spreading matrix $\Theta$ defines the spreading pattern and the spreading sequence used to spread the modulation symbols $a_1$ and $a_2$ of a particular terminal 32. The actual values of the spreading coefficients $\delta = [\delta_1, \delta_2, \delta_3, \delta_4]$ and $\beta = [\beta_1, \beta_2, \beta_3]$ within the time spreading matrix $\Theta$ dictate the spreading sequence, while the position of those coefficients within the matrix $\Theta$ dictates the spreading pattern. As an example, the time spreading matrix Θ below would define a different spreading pattern than the one in equation (8), even if the actual values of the spreading coefficients δ=[δ$_1$,δ$_2$,δ$_3$,δ$_4$] and β=[β$_1$,β$_2$,β$_3$] remained the same, because the matrix Θ below spreads the modulation symbols a$_1$ and a$_2$ over different time slots:

$$\Theta = \begin{bmatrix} \delta_1 & 0 \\ \delta_2 & 0 \\ \delta_3 & 0 \\ \delta_4 & 0 \\ 0 & \beta_1 \\ 0 & \beta_2 \\ 0 & \beta_3 \end{bmatrix} \quad (9)$$

As another example, if the spreading sequences are δ=[1 1 1 1] and β=[1 1 1], the time spreading matrix Θ simplifies to:

$$\Theta = \begin{bmatrix} 1 & 0 \\ 1 & 0 \\ 0 & 1 \\ 0 & 1 \\ 0 & 1 \\ 1 & 0 \\ 1 & 0 \end{bmatrix} \quad (10)$$

In various embodiments mentioned above, all terminals 32 within group 30 spread their respective modulation symbols a$_1$ and a$_2$ with both a common time-domain spreading pattern and a common time-domain spreading sequence. In this case, all R terminals 32 within group 30 have the same time spreading matrix Θ. Modifying equation (7) for the received signal accordingly produces:

$$Y = X + V = \sum_{r=1}^{R} X^{(r)} + V = \sum_{r=1}^{R} \Theta a^{(r)} \circ w^{(r)} \circ h^{(r)} + V, \quad (11)$$

such that each rank-one tensor $X^{(r)}$ remains constrained according to the common time-domain spreading pattern and the common time-domain spreading sequence defined by the time spreading matrix Θ.

Of course, in order to manipulate tensors mathematically, tensors are often represented by a set of ordered matrices $Y_1, Y_2, Y_3$ called unfolded representations. Each unfolded representation stacks different dimensional slices of a tensor column-wise:

$$Y_1 = \begin{bmatrix} Y_{1..} \\ \vdots \\ Y_{N..} \end{bmatrix} \in \mathbb{C}^{NP \times K}, \quad Y_2 = \begin{bmatrix} Y_{.1.} \\ \vdots \\ Y_{.P.} \end{bmatrix} \in \mathbb{C}^{PK \times N}, \quad (12)$$

$$Y_3 = \begin{bmatrix} Y_{..1} \\ \vdots \\ Y_{..K} \end{bmatrix} \in \mathbb{C}^{KN \times P},$$

where $Y_{n..} \in \mathbb{C}^{P \times K}$ is the n-th slice considering the first domain fixed, $Y_{.p.} \in \mathbb{C}^{K \times N}$ is the p-th slice in the second domain, and $Y_{..k} \in \mathbb{C}^{N \times P}$ is the k-th slice in the third domain.

In order to model the received composite signal Y in this way, the parameters associated with the R terminals may be collected into matrices as follows:

$$S = [s^{(1)} \ldots s^{(R)}] \in \mathbb{C}^{N \times R} \quad (13)$$

$$W = [w^{(1)} \ldots w^{(R)}] \in \mathbb{C}^{P \times R} \quad (14)$$

$$H = [h^{(1)} \ldots h^{(R)}] \in \mathbb{C}^{K \times R} \quad (15)$$

where S is called the symbol matrix, W is called the coding matrix, and H is called the channel matrix. Note in the case above where all R terminals 32 within group 30 have the same time spreading matrix Θ, the symbol matrix S may be factored in view of equation (8) as:

$$S = [\Theta a^{(1)} \ldots \Theta a^{(R)}] = \Theta A, \quad (16)$$

where $A = [a^{(1)} \ldots a^{(R)}]$ is called the effective symbol matrix. The received composite signal Y may then be modeled as a tensor with unfolded representations $\hat{Y}_1, \hat{Y}_2, \hat{Y}_3$:

$$\hat{Y}_1 = Z_1 H^T + V_1, \quad (17)$$

$$\hat{Y}_2 = Z_2 A^T \Theta^T + V_2, \quad (18)$$

$$\hat{Y}_3 = Z_3 W^T + V_3, \quad (19)$$

where $Z_1 = (\Theta A \diamond W), Z_2 = (W \diamond H), Z_3 = (H \diamond \Theta A)$, with $\diamond$ denoting the Kronecker product, where $V_1$, $V_1$, and $V_1$ are unfolded representations of the noise V, and where A, H, and W represent the component matrices of the model. Note that the time spreading matrix Θ constrains the model as it remains fixed according to the common time-domain spreading pattern and the common time-domain spreading sequence used by the terminals 32 in group 30.

Given this constrained tensor model of the received composite signal, receiver 10 can separate the R component signals by fitting the model to the composite signal tensor. More particularly, the set 16 of cascaded LS estimators in the receiver 10 alternate between fitting different unfolded representations of the model to different unfolded representations of the composite signal tensor. To do so, the set 16 of estimators alternates between adapting different component matrices of the model in order to successively improve the fit between the model and the composite signal tensor. The set 16 of estimators adapts any given component matrix based on knowledge or estimates of other component matrices, and based on the time spreading matrix Θ (referred to as the "first" constraint matrix) remaining fixed according to the spreading of the component signals over time.

Figure 4:
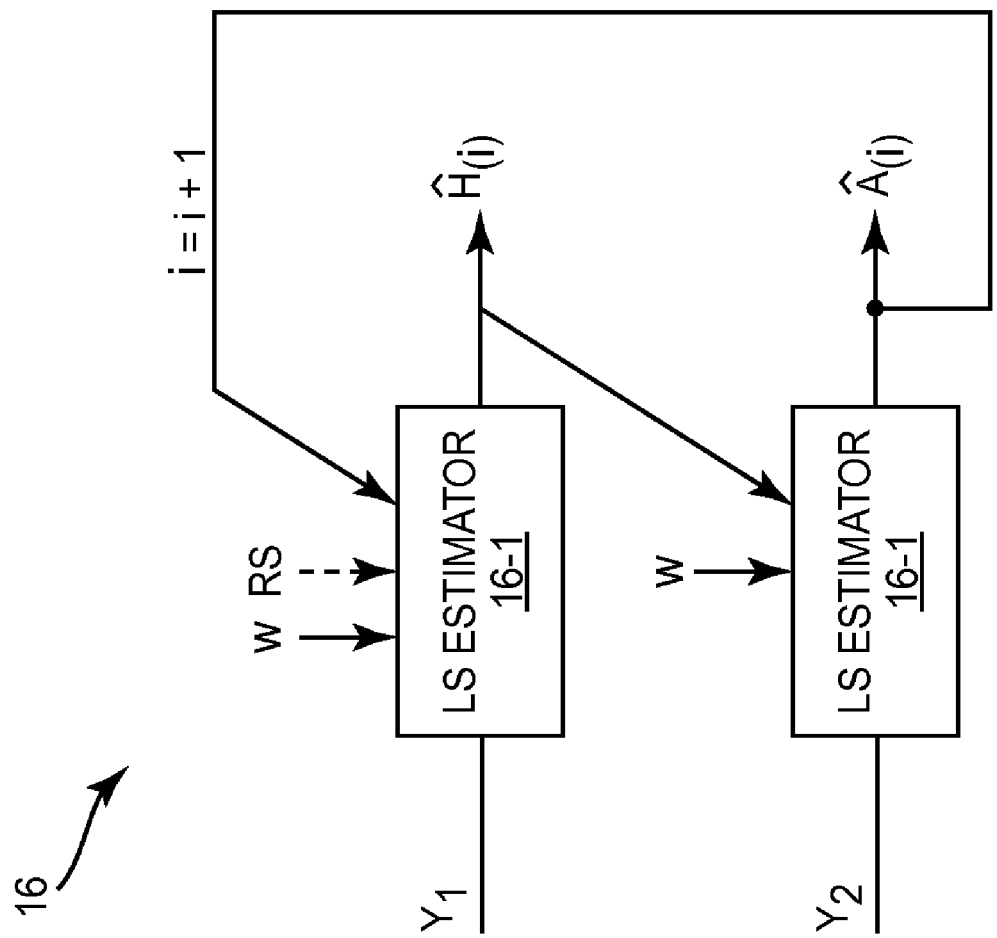
FIG. 4 is a block diagram of a set of least squares estimators included in the receiver of FIG. 1 according to some embodiments.

As described thus far, the receiver 10 is concerned only with the R component signals received from the terminals 32 supported by the base station 20. Since the base station 20 supports these terminals 32, it has knowledge of the frequency-domain spreading sequences with which the terminals 32 spread the component signals; that is, the base station 20 has knowledge of the coding matrix W. Accordingly, in such embodiments, the set 16 of estimators alternates between adapting the component matrices A and H, based on knowledge of W and estimates of whichever matrix is currently not being adapted (i.e., H and A respectively). FIG. 4 illustrates this estimation process according to various embodiments herein.

In FIG. 4, the set 16 of estimators consists of two LS estimators 16-1 and 16-2 that alternate over different iterations i=0, 1, . . . between adapting Ĥ and Â respectively. At each iteration, one of the LS estimators 16-1, 16-2 acquires an estimate of one of the component matrices Ĥ or Â in the LS sense, while the other component matrix $\hat{A}$ or $\hat{H}$ is fixed to its value obtained in a previous iteration (or to its initialized value).

The first LS estimator 16-1, for example, accepts as input the first unfolded representation $Y_1$ of the composite signal tensor as well as the known coding matrix W. The first LS estimator 16-1 may also accept the reference signal (RS). In any case, the first LS estimator 16-1 fits the first unfolded representation $\hat{Y}_1$ of the constrained tensor model to the first unfolded representation $Y_1$ of the composite signal tensor by adapting the component matrix $\hat{H}$ according to:

$$\underset{\hat{H}_{(i)}}{\operatorname{argmin}} \|Y_1 - \hat{Z}_{1,(i)}\hat{H}_{(i)}^T\|_F^2 \quad (20)$$

where $\hat{Z}_{1,(i)} = (\Theta \hat{A}_{(i-1)} \diamond W)$ and $$\hat{A}_{(i=0)} = \begin{bmatrix} 0 & 0 & \cdots & 0 \\ 1 & 1 & \cdots & 1 \end{bmatrix} \in \mathbb{C}^{2 \times R}.$$

Notice that the component matrix $\hat{A}$ remains fixed during any given iteration i to the value obtained for $\hat{A}$ by the second LS estimator 16-1 in a previous iteration; namely, to $\hat{A}_{(i-1)}$. Assuming that the noise is perfectly balanced over the diversity branches, i.e., $\sigma_{V,1}^2 = \sigma_{V,2}^2 = \sigma_{V,3}^2 = \sigma_{V,4}^2$, the solution of this LS problem at the first iteration i=1 is given by:

$$\hat{H}_{(i=1)}^T = [\hat{Z}_{1,(i=1)}]^\dagger Y_1 = [(\hat{Z}_{1,(i=1)}^H \hat{Z}_{1,(i=1)})^{-1} \hat{Z}_{1,(i=1)}^H]$$
$$Z_1 H^T + [\hat{Z}_{1,(i=1)}]^\dagger V_1 \quad (21)$$

where $\hat{Z}_{1,(i=1)} = (\Theta \hat{A}_{(i=0)} \diamond W) = [0_R \; 0_R \; W \; W \; W \; 0_R \; 0_R]^T$.

The second LS estimator 16-2 likewise accepts as input the second unfolded representation $Y_2$ of the composite signal tensor as well as the known coding matrix W. The second LS estimator 16-2 fits the second unfolded representation $\hat{Y}_2$ of the constrained tensor model to the second unfolded representation $Y_2$ of the composite signal tensor by adapting the component matrix $\hat{A}$ according to:

$$\underset{\hat{A}_{(i)}}{\operatorname{argmin}} \|Y_2 - \hat{Z}_{2,(i)} \hat{A}_{(i)}^T \Theta^T\|_F^2 \quad (22)$$

where $\hat{Z}_{2,(i)} = (W \diamond \hat{H}_{(i)})$. Again assuming that the noise is perfectly balanced over the diversity branches, the solution of this LS problem at the first iteration i=1 is given by:

$$\hat{A}_{(i=1)}^T = [\hat{Z}_{2,(i=1)}]^\dagger Y_2 [\Theta^T]^\dagger \quad (23)$$
$$= \left[(\hat{Z}_{2,(i=1)}^H \hat{Z}_{2,(i=1)})^{-1} \hat{Z}_{2,(i=1)}^H\right] Z_2 A^T \Theta^T [\Theta^T]^\dagger +$$
$$[\hat{Z}_{2,(i=1)}]^\dagger V_2 [\Theta^T]^\dagger$$

where $$\hat{Z}_{2,(i=1)} = (W \diamond \hat{H}_{(i=1)}) = \begin{bmatrix} \hat{H}_{(i=1)} D_1(W) \\ \hat{H}_{(i=1)} D_2(W) \\ \vdots \\ \hat{H}_{(i=1)} D_{12}(W) \end{bmatrix}.$$

Here, $D_x(U)$ forms a diagonal matrix out of row x of U. This alternating LS estimation process proceeds until it converges or for some predetermined number of iterations, at which point the process simultaneously produces LS estimates for each of the component signals carried by the composite signal. Convergence is guaranteed under mild conditions and the number of iterations may be fixed or variable at each transmission. In embodiments where the number of iterations is variable, the estimation process completes when the mean square error of the model converges to a local minimum.

Of course, in practical receivers the noise may be unbalanced over the diversity branches, i.e., $\sigma_{V,1}^2 \neq \sigma_{V,2}^2 \neq \sigma_{V,3}^2 \neq \sigma_{V,4}^2$. To account for this unbalanced noise variance, one or more embodiments replace $[\hat{Z}_{2,(i)}]^\dagger = (\hat{Z}_{2,(i)}^H \hat{Z}_{2,(i)})^{-1} \hat{Z}_{2,(i)}^H$ in equations (21) and (23) with $(\hat{Z}'_{2,(i)}^H \hat{Z}'_{2(i)})^{-1} \hat{Z}'_{2(i)}$, where:

$$Z'_{2,(i=1)} = (W \diamond \Sigma^{-1} \hat{H}_{(i)}) = \begin{bmatrix} \Sigma^{-1} \hat{H}_{(i)} D_1(W) \\ \Sigma^{-1} \hat{H}_{(i)} D_2(W) \\ \vdots \\ \Sigma^{-1} \hat{H}_{(i)} D_{12}(W) \end{bmatrix}.$$

In this case, $\Sigma^2 = D([\sigma_{V,1}^2 \; \sigma_{V,2}^2 \; \sigma_{V,3}^2 \; \sigma_{V,4}^2])$ denotes the unbalanced noise covariance matrix. Then, using the previous adjusted equation, the effective symbol matrix is used as input to the next iteration to re-estimate the channel, and so on.

Note that $\hat{H}$ may represent the estimated channel matrix after $N_{it}$ iterations of the estimation process. Each estimated ACK/NACK symbol denoted $\hat{a}^{(r)}$ is multiplied by its respective estimated effective channel defined as:

$$\hat{h}_{\text{eff}}^{(r)} = \sqrt{\sum_{k=1}^{4} \frac{|h_k^{(r)}|^2}{\sigma_{V,k}^2}}$$

so that the decision variable for the ACK/NACK symbol associated with the r-th UE is defined as:

$$\hat{D}^{(r)} = \hat{h}_{\text{eff}}^{(r)} \hat{a}^{(r)}.$$

Now consider processing of the scheduling request. At the base station 20, the SR is treated as negative acknowledgement, and thus its absence can be represented by a zero in the constrained tensor model. More particularly, the model may include R+1 factors, where the last factor is associated with the SR. The receiver 10 may then deal with the DTX state by checking the absence or presence of energy in the last factor. For example, with R=2 terminals and with $a^{(1)}=+1$ and $a^{(2)}=-1$, the effective symbol matrix would be represented by $$A = \begin{bmatrix} +1 & -1 & 0 \\ 1 & 1 & 1 \end{bmatrix} \in \mathbb{C}^{2 \times 3}$$

in the case of DTX.

In other, multi-cell embodiments, the receiver 10 is concerned not only with desired component signals received from terminals 32 supported by the base station 20, but also interfering component signals from terminals in other cells that are not supported by the base station 20. In the case that there are Q−1 other cells, the component signals originate from $R=R_1+\ldots+R_Q$ terminals, where $R_1$ represents the number of terminals 32 supported by base station 20 and $R_q$ for q>1 represents the number of terminals in the q-th other cell. The received signal tensor that describes this scenario is given by:

$$Y = X + V = \sum_{q=1}^{Q} \sum_{r_q=1}^{R_q} \Theta a_q^{(r_q)} \circ w_q^{(r_q)} \circ h_q^{(r_q)} + V. \quad (24)$$

where $a_q^{(r_q)}$, $w_q^{(r_q)}$, $h_q^{(r_q)}$ are respectively the effective symbol, coding and channel vectors associated with the $r_q$-th terminal connected to the q-th cell. Note that the coding vector associated with the $r_q$-th terminal connected to the q-th cell is defined as:

$$w_q^{(r_q)} = \begin{bmatrix} w_1^{(r_q)} \\ w_2^{(r_q)} \\ \vdots \\ w_{12}^{(r_q)} \end{bmatrix} = \begin{bmatrix} b_1(q)e^{j\alpha_{r_q} \cdot 0} \\ b_2(q)e^{j\alpha_{r_q} \cdot 1} \\ \vdots \\ b_{12}(q)e^{j\alpha_{r_q} \cdot 11} \end{bmatrix} \in \mathbb{C}^{12 \times 1}, \quad (25)$$

where $b(q)=[b_1(q), \ldots, b_{12}(q)] \in \mathbb{C}^{1\times 12}$ is the cell-specific base sequence assigned to the q-th cell. The component matrices can thereby be written as:

$$A=[A(1) \ldots A(Q)] \in \mathbb{C}^{2\times R} \quad (26)$$

$$W=[W(1) \ldots W(Q)] \in \mathbb{C}^{12\times R} \quad (27)$$

$$H=[H(1) \ldots H(Q)] \in \mathbb{C}^{4\times R} \quad (28)$$

where A(q), W(q), H(q) are the component matrices associated with the $R_q$ terminals of the q-th cell.

Figure 5:
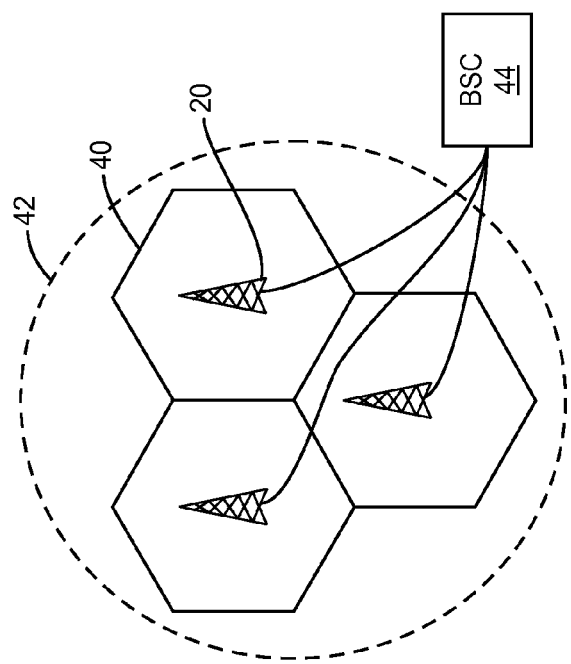

Similar to the single-cell embodiments, the base station 20 directly knows the frequency-domain spreading sequences used by the terminals 32 it supports; that is, the base station 20 knows W(1) in equation (27). In some embodiments, the base station 20 also knows the frequency-domain spreading sequences used by terminals in other cells it does not support, such that it knows W in its entirety. FIG. 5 illustrates an example of this embodiment.

In FIG. 5, the base station 20 is associated with one cell 40 in a group of cells 42. Each of the cells in the group 42 is cooperatively connected to the same base station controller 44 (e.g., e-NodeB). Connected in this way, the cells in the group 42 can exchange control signaling information (e.g., concerning physical layer information) amongst themselves. In particular, the base station 20 is configured to receive control signaling from the other cells in group 42 that indicates the number of interfering component signals and the frequency-domain spreading sequences used to spread those signals. Given this information, the base station 20 knows W in its entirety. Because base station 20 knows W in its entirety, separation of the component signals in the received composite signal proceeds very similarly to that already described for single-cell embodiments.

Indeed, with the component matrices modified as in equations (26), (27), and (28) to account for a multi-cell configuration, the received composite signal Y can still be modeled using equations (17), (18), and (19). And with the component matrix W known at the base station 20, the receiver's set 16 of LS estimators alternates between adapting the component matrices A and H in much the same way as described with respect to FIG. 4.

Figure 6:
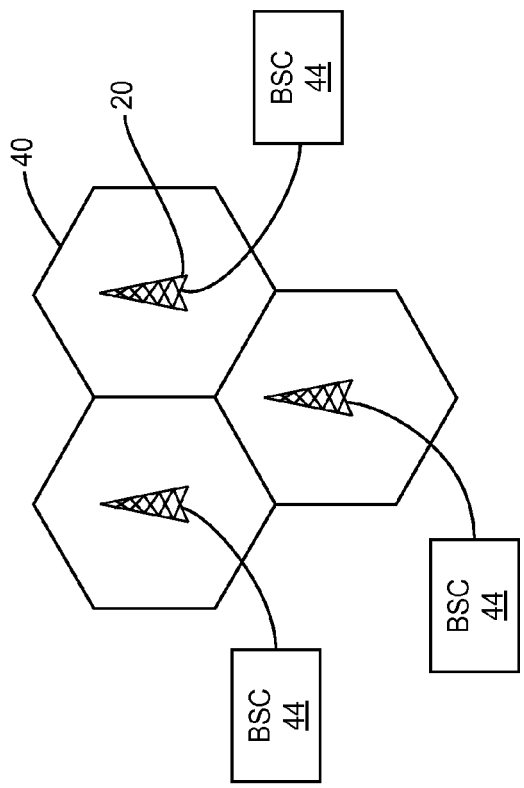
FIGS. 5 and 6 are block diagrams of cooperative and non-cooperative multi-cell configurations, respectively, in which the receiver of FIG. 1 operates according to several embodiments.
Figure 7:
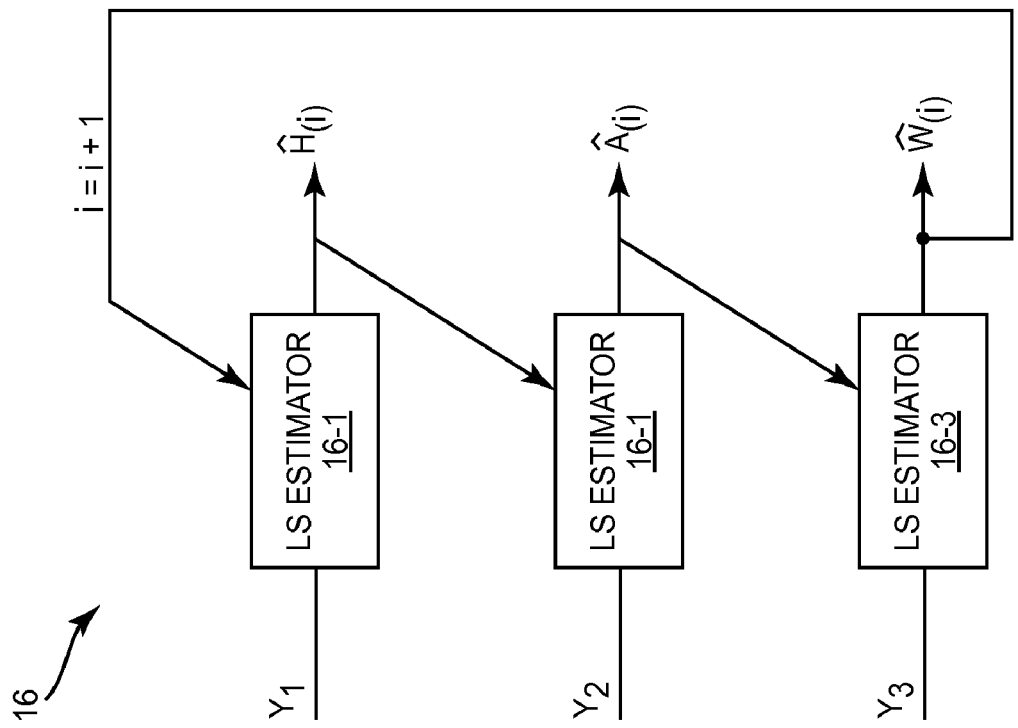
FIG. 7 is a block diagram of a set of least squares estimators included in the receiver of FIG. 1 according to other embodiments.

In other embodiments, like the one shown in FIG. 6, the base station 20 is not associated with a group of cells that exchanges this control signaling information. Rather, the base station's neighboring cells are each connected to distinct base station controllers 44. In this case, the base station 20 only knows W(1) in equation (27). Thus, the base station 20 in these embodiments estimates the rank of the composite signal tensor to determine the number of interfering component signals and then estimates W(q) for q>1. FIG. 7 illustrates an example of such embodiments.

In FIG. 7, the set 16 of estimators consists of three LS estimators 16-1, 16-2, and 16-3 that alternate over different iterations i=0, 1, . . . between adapting $\hat{H}$, $\hat{A}$, and $\hat{W}$ respectively. At each iteration, one of the LS estimators 16-1, 16-2, 16-3 acquires an estimate of one of the component matrices $\hat{H}$, $\hat{A}$, or $\hat{W}$ in the LS sense, while the other component matrices $\hat{A}$ and $\hat{W}$, $\hat{H}$ and $\hat{W}$, or $\hat{H}$ and $\hat{A}$, respectively, remain fixed to their values obtained in a previous iteration (or to their initialized value).

Particularly with regard to estimation of $\hat{W}$, the q-th sub-matrix $W(q) \in \mathbb{C}^{12\times R_q}$ is initialized using the base sequence b(q) coupled with $R_q$ phase rotations randomly chosen from a pre-defined finite set. Thus, $\hat{W}$ is initialized as:

$$\hat{W}_{(i=0)} = [W(1) \ldots \hat{W}(q)_{(i=0)} \ldots \hat{W}(Q)_{(i=0)}]. \quad (29)$$

Then, during the first iterations, the coding vectors associated with the interfering terminals are estimated in order to cancel the interference in subsequent iterations. At the i-th iteration, the coding matrix $\hat{W}$ is thus estimated as:

$$\hat{W}_{(i)}^T = [\hat{Z}_{3,(i)}]^\dagger Y_3 \quad (30)$$
$$= (\hat{Z}_{3,(i)}^H \hat{Z}_{3,(i)})^{-1} \hat{Z}_{3,(i)}^H Z_{3,(i)} W^T + [\hat{Z}_{3,(i)}]^\dagger V_3$$

which can be written as:

$$\hat{W}_{(i)} = [W(1) \ldots \hat{W}(q)_{(i)} \ldots \hat{W}(Q)_{(i)}]. \quad (31)$$

Although the coding matrices W(q) for q>1 are unknown, each coding vectors obeys the rule $\|w^{(r_q)}\|^2=12$. Thus, at the end of the i-th iteration the estimated coding vectors are normalized such that $\|w_{(i)}^{(r_q)}\|^2=12$. This estimated coding matrix is used in the next iteration to reestimate the channel and so on.

The above embodiments, whether single-cell or multi-cell, may be modified to take into account certain time-hopping techniques that randomize inter-cell interference. Thus, in some embodiments, each component signal of the received composite signal has been spread with time-domain spreading sequences, frequency-domain spreading sequences, or both that vary over time according to a time-hopping pattern. As explained in more detail below, each rank-one tensor of the tensor model is constrained according to this time-hopping pattern.

In various embodiments, for example, the receiver 10 is configured to receive the composite signal over multiple time slots, where each component signal has been spread with different frequency-domain spreading sequences in different time slots. In this case, the receiver 10 is configured to adapt any given component matrix further based on a second constraint matrix that remains fixed according to the spreading of each component signal with different frequency-domain spreading sequences in different time slots.

Extending the previous embodiments to this case, the second constraint matrix may be defined as:

$$\Phi = I_R \otimes 1_2^T = \begin{bmatrix} 1 & 1 & 0 & 0 & \cdots & 0 & 0 \\ 0 & 0 & 1 & 1 & \cdots & 0 & 0 \\ 0 & 0 & 0 & 0 & \ddots & 0 & 0 \\ 0 & 0 & 0 & 0 & \cdots & 1 & 1 \end{bmatrix} \in \mathbb{C}^{R \times 2R} \quad (32)$$

where $1_L^T = [1 \ldots 1]^T \in \mathbb{C}^{1 \times L}$. This matrix models the interaction of each symbol vector with different coding vectors in different time slots. Thus, when slot-basis hopping is employed, the symbol matrix S of equation (13) can be redefined as:

$$S = \Theta A \Phi \in \mathbb{C}^{7 \times 2R}, \quad (33)$$

where $\Theta \in \mathbb{C}^{7 \times 2}$ is the time spreading matrix (i.e., the first constraint matrix) defined previously.

As a simple example, consider the case where two terminals (R=2) are served by two different cells. The symbol matrix S can then be expressed as:

$$S = \Theta A \Phi = \begin{bmatrix} 1 & 0 \\ 1 & 0 \\ 0 & 1 \\ 0 & 1 \\ 0 & 1 \\ 1 & 0 \\ 1 & 0 \end{bmatrix} \begin{bmatrix} a^{(1)} & a^{(2)} \\ 1 & 1 \end{bmatrix} \begin{bmatrix} 1 & 1 & 0 & 0 \\ 0 & 0 & 1 & 1 \end{bmatrix} = \quad (34)$$

$$\begin{bmatrix} a^{(1)} & a^{(1)} & a^{(2)} & a^{(2)} \\ a^{(1)} & a^{(1)} & a^{(2)} & a^{(2)} \\ 1 & 1 & 1 & 1 \\ 1 & 1 & 1 & 1 \\ 1 & 1 & 1 & 1 \\ a^{(1)} & a^{(1)} & a^{(2)} & a^{(2)} \\ a^{(1)} & a^{(1)} & a^{(2)} & a^{(2)} \end{bmatrix} \in \mathbb{C}^{7 \times 4}.$$

under the assumption that the spreading sequences are $\delta = [1\ 1\ 1\ 1]$ and $\beta = [1\ 1\ 1]$, and denoting the modulation symbol $a_1$ for each terminal as a and the modulation symbol $a_2$ for each terminal as 1.

Correspondingly, the number of coding vectors in the coding matrix W must be extended. Continuing with the above example, where each symbol is transmitted in two time slots, and where two terminals are served by two different cells, the coding matrix W is redefined as $$W = [w^{(1)} w^{(2)} w^{(3)} w^{(4)}] \in \mathbb{C}^{12 \times 4}. \quad (35)$$

This matrix indicates that the symbols associated with the first terminal are transmitted in the first and the second time slots using, respectively, the coding vectors $w^{(1)}$ and $w^{(2)}$ while the symbols associated with the second terminal are transmitted in the same slots using, respectively, the coding vectors $w^{(3)}$ and $w^{(4)}$.

The channel matrix H is also modified. In particular, rather than the matrix H stacking channel coefficients associated with different time slots on top of one another, the channel matrix is defined as:

$$H^{(r)} = [h_{Slot\#1}^{(r)}\ h_{Slot\#2}^{(r)}] = \begin{bmatrix} h_1^{(r)} & h_3^{(r)} \\ h_2^{(r)} & h_4^{(r)} \end{bmatrix} (\in \mathbb{C})^{2 \times 2}, \quad (36)$$

where $h_{Slot\#1}^{(r)} = [h_1^{(r)}, h_2^{(r)}]^T$ and $h_{Slot\#2}^{(r)} = [h_3^{(r)}, h_4^{(r)}]^T$ are associated, respectively, with the first and second slots of the r-th terminal. Considering the simple example again, the channel matrix would be converted into:

$$H = [h_{Slot\#1}^{(1)}, h_{Slot\#2}^{(1)}, h_{Slot\#1}^{(2)}, h_{Slot\#2}^{(2)}] = \begin{bmatrix} h_1^{(1)} & h_3^{(1)} & h_1^{(2)} & h_3^{(2)} \\ h_2^{(1)} & h_4^{(1)} & h_2^{(2)} & h_4^{(2)} \end{bmatrix} \in \mathbb{C}^{2 \times 4}. \quad (37)$$

The component matrices and their dimensions are correspondingly redefined from their forms in equations (13), (14), and (15) as:

$$S = [\Theta a^{(1)} \Theta a^{(1)} \ldots \Theta a^{(R)} \Theta a^{(R)}] \in \mathbb{C}^{N \times 2R} \quad (38)$$

$$H = [h_{Slot\#1}^{(1)} h_{Slot\#2}^{(1)} \ldots h_{Slot\#1}^{(R)} h_{Slot\#2}^{(R)}] \in \mathbb{C}^{K \times 2R} \quad (39)$$

$$W = [w^{(1)} w^{(2)} \ldots w^{(2R-1)} w^{(2R)}] \in \mathbb{C}^{P \times 2R} \quad (40)$$

With the component matrices defined in this way, the received composite signal Y may be modeled as a tensor with unfolded representations $\hat{Y}_1, \hat{Y}_2, \hat{Y}_3$:

$$Y_1 = Z_1 H^T + V_1 \quad (41)$$

$$Y_2 = Z_2 \Phi^T A^T \Theta^T + V_2 \quad (42)$$

$$Y_3 = Z_3 W^T + V_3, \quad (43)$$

where $Z_1 = (\Theta A \Phi \diamond W)$, $Z_2 = (W \diamond H)$ and $Z_3 = (H \diamond \Theta A \Phi)$. Note that the time spreading matrix $\Theta$, the first constraint matrix, still constrains the model according to the common time-domain spreading pattern and the common time-domain spreading sequence used by the terminals 32 in group 30. Also note that the second constraint matrix $\Phi$ additionally constrains the model because it remains fixed according to the spreading of each component signal with different frequency-domain spreading sequences in different time slots. In fact, the second constraint matrix $\Phi$ is only a function of the number of terminals R.

Given this constrained tensor model of the received composite signal, receiver 10 can separate the R component signals by fitting the model to the composite signal tensor in much the same way as described with respect to FIGS. 4 and 6. However, the second LS estimator 16-2 in these embodiments fits the second unfolded representation $\hat{Y}_2$ of the constrained tensor model to the second unfolded representation $Y_2$ of the composite signal tensor by adapting the component matrix $\hat{A}$ according to:

$$\operatorname*{argmin}_{\hat{A}_{(i)}} \| Y_2 - \hat{Z}_{2,(i)} \Phi^T \hat{A}_{(i)}^T \Theta^T \|_F^2 \quad (44)$$

where $\hat{Z}_{1,(i)} = (\Theta \hat{A}_{(i-1)} \Phi \diamond \hat{W}_{(i-1)})$, $\hat{Z}_{2,(i)} = (\hat{W}_{(i-1)} \diamond \hat{H}_{(i)})$, $\hat{Z}_{3,(i)} = (\hat{H}_{(i)} \diamond \Theta \hat{A}_{(i-1)} \Phi)$. Initialization of $\hat{W}_{(i=0)}$ proceeds in the same manner, depending on whether the base station 20 knows or does not know the frequency-domain spreading sequences for any interfering component signals.

Other embodiments extend the time-hopping techniques even further. In these embodiments, the composite signal is an Orthogonal Frequency-Division Multiplexing (OFDM) signal, with a time slot including multiple OFDM symbol intervals. Across the time slots, each component signal is spread with different frequency-domain spreading sequences that comprise different base sequences. Across OFDM symbol intervals of any given time slot, each component signal is spread with different frequency-domain spreading sequences that comprise the same base sequence rotated by different phase rotations. As explained in more detail below, the receiver 10 in these embodiments is configured to adapt any given component matrix based on a third constraint matrix $\Omega$ that remains fixed according to the spreading of each component signal across OFDM symbol intervals.

To allocate a different coding vector to each modulation symbol, the symbol matrix S of the above embodiments is converted into a symbol matrix $\bar{S}$. Consider, for example, the symbol matrix $\bar{S}$ that results from converting the symbol matrix S in equation (34). The symbol matrix $\bar{S}$ simply places each column of S into its own diagonal matrix:

$$\bar{S}=[D_1(S)D_2(S)D_3(S)D_4(S)] \in \mathbb{C}^{7 \times 28} \tag{45}$$

where $D_x(S)$ is a diagonal matrix formed from column x of S. For example:

$$D_1(S) = \begin{bmatrix} a^{(1)} & 0 & 0 & 0 & 0 & 0 & 0 \\ 0 & a^{(1)} & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & a^{(1)} & 0 \\ 0 & 0 & 0 & 0 & 0 & 0 & a^{(1)} \end{bmatrix} \in \mathbb{C}^{7 \times 7}. \tag{46}$$

The symbol matrix $\bar{S}$ may equivalently be expressed as a function of $S^T = G$:

$$\bar{S}=[D_1(G)D_2(G)D_3(G)D_4(G)] \in \mathbb{C}^{7 \times 28}, \tag{47}$$

where $D_x(S)$ here is instead a diagonal matrix formed from row x of G, and where $$G = S^T = (\Theta A \Phi)^T = \begin{bmatrix} a^{(1)} & a^{(1)} & 1 & 1 & 1 & a^{(1)} & a^{(1)} \\ a^{(1)} & a^{(1)} & 1 & 1 & 1 & a^{(1)} & a^{(1)} \\ a^{(2)} & a^{(2)} & 1 & 1 & 1 & a^{(2)} & a^{(2)} \\ a^{(2)} & a^{(2)} & 1 & 1 & 1 & a^{(2)} & a^{(2)} \end{bmatrix} \in \mathbb{C}^{4 \times 7}. \tag{48}$$

In this regard, the transpose of the symbol matrix $\bar{S}$, denoted as $\bar{S}^T$, can actually be understood as one of the three unfolded representations of a tensor S:

$$\bar{S}^T = S_1 = \begin{bmatrix} D_1(G) \\ D_2(G) \\ D_3(G) \\ D_4(G) \end{bmatrix} = \begin{bmatrix} I_7 D_1(G) \\ I_7 D_2(G) \\ I_7 D_3(G) \\ I_7 D_4(G) \end{bmatrix} I_7^T = (G \diamond I_7) I_7^T \in \mathbb{C}^{28 \times 7} \tag{49}$$

so that $\bar{S} = (S \diamond I_7)^T$. Another unfolded representation can be written:

$$S_2 = (I_7 \diamond I_7) G^T = (I_7 \diamond I_7) S \in \mathbb{C}^{7 \times 28}. \tag{50}$$

As demonstrated below, the receiver 10 may use this second unfolded representation $S_2$ in fitting the constrained tensor model to the composite signal tensor.

Regardless of how the symbol matrix $\bar{S}$ is expressed, the coding matrix W is also extended in these embodiments to allocate a different coding vector to each modulation symbol. In particular, the coding matrix W is re-defined to include all available coding vectors, and a third constraint matrix $\Omega$ called the resource allocation matrix allocates different coding vectors from the coding matrix W to different modulation symbols. Consider again the example of two time slots and R=2 terminals in two different cells. In this case, the coding matrix is:

$$W=[W(1,Slot\#1)W(1,Slot\#2)W(2,Slot\#1)W(2,Slot\#2)] \in \mathbb{C}^{12 \times 24}, \tag{51}$$

where the matrices associated with the first cell are given by:

$$\underbrace{W(1, Slot\#1) = [w^{(1)} \cdots w^{(6)}]}_{\text{phase-rotated base-sequence for Slot\#1}} \text{ and } \underbrace{W(1, Slot\#2) = [w^{(7)} \cdots w^{(12)}]}_{\text{phase-rotated base-sequence for Slot\#2}},$$

and the matrices associated with the second cell are given by:

$$\underbrace{W(2, Slot\#1) = [w^{(13)} \cdots b^{(18)}]}_{\text{phase-rotated base-sequence for Slot\#1}} \text{ and}$$

$$\underbrace{W(2, Slot\#1) = [w^{(19)} \cdots w^{(24)}]}_{\text{phase-rotated base-sequence for Slot\#2}}.$$

The resource allocation matrix $\Omega$ is block diagonal according to:

$$\Omega = \text{Block}Diag\{\Omega(1,Slot\#1)\Omega(1,Slot\#2)\Omega(2,Slot\#1)\Omega(2,Slot\#1)\}, \tag{52}$$

where each block matrix $\Omega(x,Slot\#y)$ selects a set of coding vectors for each slot y. As one example, suppose that the first terminal in the first cell is allocated phase rotations {1,2,3,5, 2,4,6} for the first slot. In this case, the first block matrix $\Omega(1,Slot\#1)$ is:

$$\Omega(1, Slot\#1) = \begin{bmatrix} 1 & 0 & 0 & 0 & 0 & 0 & 0 \\ 0 & 1 & 0 & 0 & 1 & 0 & 0 \\ 0 & 0 & 1 & 0 & 0 & 0 & 0 \\ 0 & 0 & 0 & 0 & 0 & 1 & 0 \\ 0 & 0 & 0 & 1 & 0 & 0 & 0 \\ 0 & 0 & 0 & 0 & 0 & 0 & 1 \end{bmatrix},$$

such that the coding vectors associated with the first slot of the first terminal is given by the product:

$$W(1,Slot\#1)\Omega(1,Slot\#1)=[w^{(1)}w^{(2)}w^{(3)}w^{(5)}w^{(2)}w^{(4)}w^{(6)}].$$

When all terminals and slots are considered together, the coding matrix in embodiments that allocate a different coding vector to each modulation symbol is denoted as:

$$\bar{W} = W\Omega \in \mathbb{C}^{12 \times 14R}, \tag{53}$$

where $W \in \mathbb{C}^{12 \times 12R}$ is the full coding matrix and $\Omega \in \mathbb{C}^{12R \times 14R}$ is the resource allocation matrix.

Notice that the channel matrix H in equation (37) just takes into account the channel for each time slot. In some embodiments, this channel matrix is modified to take into account the channel for each modulation symbol. In this regard, however, the coherence time of the channel is assumed to be approximately equal to a time slot, as modeled by a fourth constraint matrix $\Psi$. This fourth constraint matrix $\Psi$ therefore modifies the channel matrix H in equation (37) so that the channel coefficients are the same across the OFDM symbols of any given time slot:

$$\overline{H} = H\Psi \in \mathbb{C}^{2 \times 14R}. \quad (54)$$

where $\Psi = I_{2R} \otimes I_7^T \in \mathbb{C}^{2R \times 14R}$. Considering again the running example of two time slots and R=2 terminals in two different cells, the fourth constraint matrix $$\Psi = \begin{bmatrix} 1 & 1 & 1 & 1 & 1 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 1 & 1 & 1 & 1 & 1 & 1 & 1 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 1 & 1 & 1 & 1 & 1 & 1 & 1 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 1 & 1 & 1 & 1 & 1 & 1 & 1 \end{bmatrix}$$

modifies the channel matrix H to be $$\overline{H} = \begin{bmatrix} h_1^{(1)} & \cdots & h_1^{(1)} & h_3^{(1)} & \cdots & h_3^{(1)} & h_1^{(2)} & \cdots & h_1^{(2)} & h_3^{(2)} & \cdots & h_3^{(2)} \\ h_2^{(1)} & \cdots & h_2^{(1)} & h_4^{(1)} & \cdots & h_4^{(1)} & h_2^{(2)} & \cdots & h_2^{(2)} & h_4^{(2)} & \cdots & h_4^{(2)} \end{bmatrix} \in \mathbb{C}^{2 \times 28}.$$

The component matrices and their dimensions are correspondingly redefined from their forms in equations (38), (39), and (40) as:

$$\overline{S} = [D_1(G) \ldots D_R(G)] \in \mathbb{C}^{7 \times 14R} \text{ where } G = (\Theta A \Phi)^T \quad (55)$$

$$\overline{H} = H\Psi \in \mathbb{C}^{2 \times 14R} \quad (56)$$

$$\overline{W} = W\Omega \in \mathbb{C}^{12 \times 14R}. \quad (57)$$

With the component matrices defined in this way, the received composite signal Y may be modeled as a tensor with unfolded representations $\hat{Y}_1, \hat{Y}_2, \hat{Y}_3$:

$$Y_1 = Z_1 \overline{H}^T + V_1 \quad (58)$$

$$Y_2 = Z_2 \overline{S}^T + V_2 \quad (59)$$

$$Y_3 = Z_3 \overline{W}^T + V_3 \quad (60)$$

where $Z_1 = (\overline{S} \diamond \overline{W})$, $Z_2 = (\overline{W} \diamond \overline{H})$ and $Z_3 = (\overline{H} \diamond \overline{S})$. Note that the time spreading matrix $\Theta$, the first constraint matrix, still constrains the model in some embodiments according to the common time-domain spreading pattern and the common time-domain spreading sequence used by the terminals 32 in group 30. Also note that the second constraint matrix $\Phi$ additionally constrains the model according to the spreading of each component signal with different frequency-domain spreading sequences in different time slots. Further, the resource allocation matrix $\Omega$, the third constraint matrix, constrains the model according to the spreading of each component signal across the OFDM symbol intervals of any given time slot. Finally, the fourth constraint matrix $\Psi$ constrains the model by modelling the coherence time of the channel as approximately equal to a time slot.

Given this constrained tensor model of the received composite signal, receiver 10 separates the R component signals by fitting the model to the composite signal tensor in much the same way as described with respect to FIGS. 4 and 6. However, in these embodiments the set 16 of LS estimators adapts the component matrices as follows. The first LS estimator 16-1 fits the first unfolded representation $\hat{Y}_1$ of the constrained tensor model to the first unfolded representation $Y_1$ of the composite signal tensor by adapting the component matrix $\hat{H}$ according to:

$$\underset{\hat{H}_{(i)}}{\operatorname{argmin}} \| Y_1 - \hat{Z}_{1,(i)} \Psi^T \hat{H}_{(i)}^T \|_F^2 \quad (61)$$

where $\hat{Z}_{1,(i)} = (\overline{\hat{S}}_{(i-1)} \diamond \hat{W}_{(i-1)} \Omega)$. Notice that the component matrix $\overline{\hat{S}}$, and $\hat{W}$ in some embodiments, remains fixed during any given iteration i to its value obtained in a previous iteration; namely, to $\overline{\hat{S}}_{(i-1)}$. The constraint matrices of course remain fixed as well.

The second LS estimator 16-2 likewise fits the second unfolded representation $\hat{Y}_2$ of the constrained tensor model to the second unfolded representation $Y_2$ of the composite signal tensor by adapting the component matrix $\overline{\hat{S}}$ according to:

$$\underset{\overline{\hat{S}}_{(i)}}{\operatorname{argmin}} \| Y_2 - Z_{2,(i)} \overline{\hat{S}}_{(i)}^T \|_2^T \quad (62)$$

where $\hat{Z}_{2,(i)} = (\hat{W}_{(i-1)} \Omega \diamond \hat{H}_{(i)} \Psi)$. Then, in order to find a LS estimate of the effective symbol matrix A, the receiver 10 constructs the unfolded representation $\hat{S}_2$ of S discussed previously as $\hat{S}_2 = (I_7 \diamond I_7) S$ and finds A according to:

$$\underset{\hat{A}_{(i)}}{\operatorname{argmin}} \| \hat{S}_2 - (I_7 \diamond I_7) \Theta \hat{A}_{(i)} \Phi \|_F^2 \quad (63)$$

Finally, in single-cell embodiments, or in multi-cell embodiments where the receiver 10 does not know the coding matrix $\hat{W}$ in its entirety, the third LS estimator 16-3 fits the third unfolded representation $\hat{Y}_3$ of the constrained tensor model to the third unfolded representation $Y_3$ of the composite signal tensor by adapting the component matrix $\hat{W}$ according to:

$$\underset{\hat{W}_{(i)}}{\operatorname{argmin}} \| Y_3 - \hat{Z}_{3,(i)} \Omega^T \hat{W}_{(i)}^T \|_F^2 \quad (64)$$

where $\hat{Z}_{3,(i)} = (\hat{H}_{(i)} \Psi \diamond \overline{\hat{S}}_{(i)})$.

In many of the embodiments above, the time spreading matrix $\Theta$ constrained the model according to both a common time-domain spreading pattern and a common time-domain spreading sequence used by the terminals 32 in group 30. In other embodiments, however, the time spreading matrix $\Theta$ constrains the model only according to a common time-domain spreading pattern. In these embodiments, the terminals 32 in group 30 may use different time-domain spreading sequences, which are modeled through the resource allocation matrix $\Omega$.

More particularly, the time-domain spreading sequence associated with a certain slot for a certain terminal 32 can be modeled through the resource allocation matrix by replacing the 1's in that matrix by the coefficients of the spreading sequence:

$$\Omega(1, \text{Slot\#1}) = \begin{bmatrix} \delta_1 & 0 & 0 & 0 & 0 & 0 & 0 \\ 0 & \delta_2 & 0 & 0 & \beta_3 & 0 & 0 \\ 0 & 0 & \beta_1 & 0 & 0 & 0 & 0 \\ 0 & 0 & 0 & 0 & 0 & \delta_3 & 0 \\ 0 & 0 & 0 & \beta_2 & 0 & 0 & 0 \\ 0 & 0 & 0 & 0 & 0 & 0 & \delta_4 \end{bmatrix}, \quad (65)$$

In this case, therefore, the coding vectors and time-domain spreading sequence associated with the first slot and first terminal are defined by the product:

$$W(1,\text{Slot\#1})\Omega(1,\text{Slot\#1}) = [\delta_1 w^{(1)} \delta_2 w^{(2)} \beta_1 w^{(3)} \beta_2 w^{(5)} \beta_3 w^{(2)} \delta_3 w^{(4)} \delta_4 w^{(6)}]. \quad (66)$$

Otherwise, the estimation process proceeds as already described.

Figure 8:
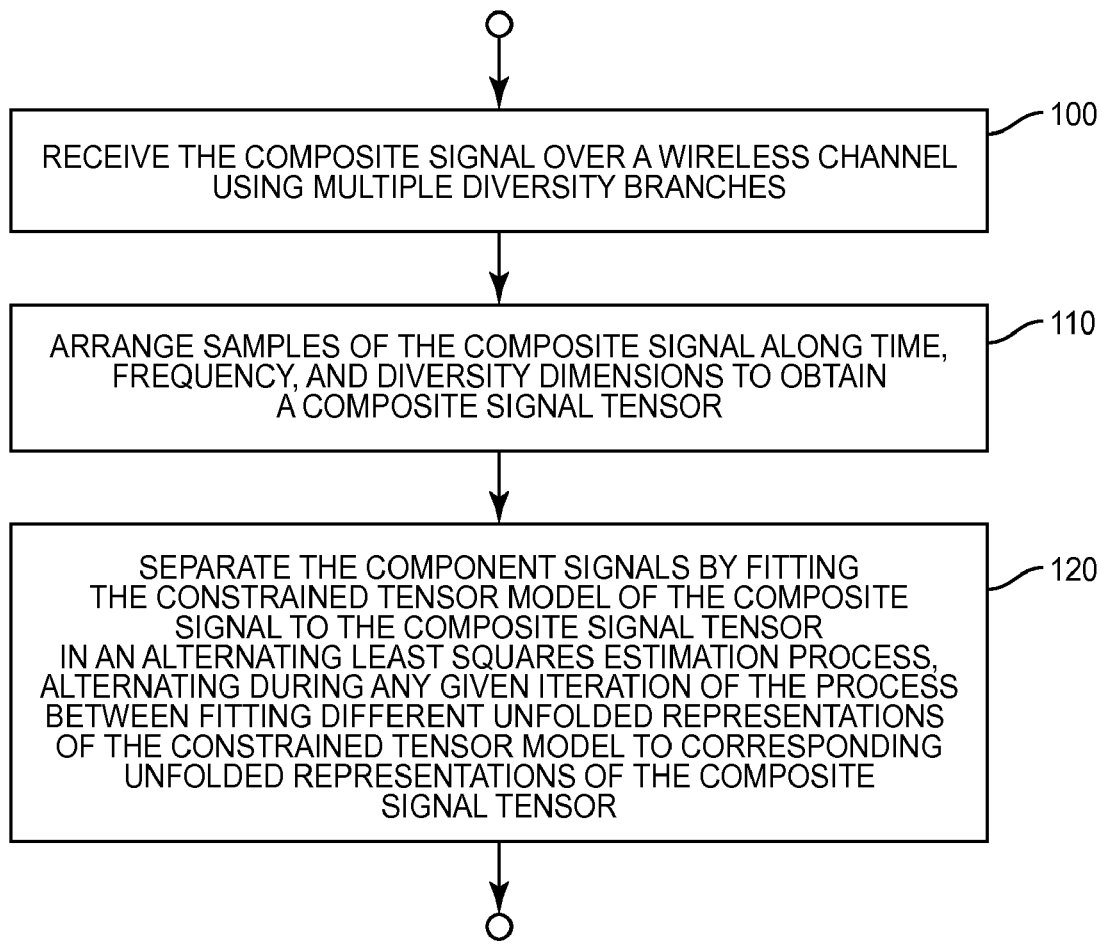
FIG. 8 is a logic flow diagram illustrating processing logic for separating multiple component signals carried in a composite signal according to some embodiments.

In view of the above modification and variations, those skilled in the art will appreciate that the receiver 10 generally performs processing illustrated in FIG. 8 for separating multiple component signals in a composite signal that have been spread in time and frequency. In FIG. 8, processing at the receiver 10 includes receiving the composite signal over a wireless channel using multiple diversity branches 12 (Block 100). Processing further includes arranging samples of the composite signal along time, frequency, and diversity dimensions to obtain a composite signal tensor (Block 110). Finally, processing entails separating the component signals by fitting a constrained tensor model of the composite signal to the composite signal tensor in an alternating least squares estimation process (Block 120). This entails alternating during any given iteration of the process between fitting different unfolded representations of the constrained tensor model to corresponding unfolded representations of the composite signal tensor. Of course, as noted above, the constrained tensor model models the composite signal as a linear combination of multiple rank-one tensors associated respectively with the multiple component signals, with each rank-one tensor being constrained according to the spreading of the associated component signal over time.

Those skilled in the art will also appreciate that the above descriptions merely illustrate non-limiting examples that have been used primarily for explanatory purposes. For example, although embodiments of the present invention have been primarily described herein with respect to separating uplink control signals on the PUCCH in LTE, those skilled in the art will recognize that the inventive techniques disclosed and claimed herein are not so limited and may be advantageously applied for separating any component signals carried in a composite signal that have been spread over time and frequency. As another example, the channel estimation described herein was used primarily for PUCCH multi-user detection, but such estimation may be advantageously used for other purposes, including channel-based scheduling or precoding of a multi-input multiple-output signal.

Those skilled in the art will further appreciate that the various "circuits" described may refer to a combination of analog and digital circuits, and/or one or more processors configured with software stored in memory and/or firmware stored in memory that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method implemented by a receiver for separating multiple component signals carried in a composite signal that have been spread over time and frequency, the method comprising:
   receiving the composite signal over a wireless channel using multiple diversity branches;
   arranging samples of the composite signal along time, frequency, and diversity dimensions to obtain a composite signal tensor; and
   separating the component signals by fitting a constrained tensor model of the composite signal to the composite signal tensor in an alternating least squares estimation process, alternating during any given iteration of the process between fitting different unfolded representations of the constrained tensor model to corresponding unfolded representations of the composite signal tensor, wherein the constrained tensor model models the composite signal as a linear combination of multiple rank-one tensors associated respectively with the multiple component signals, each rank-one tensor being constrained according to the spreading of the associated component signal over time.

2. The method of claim 1, wherein the multiple component signals have been spread with a common time-domain spreading pattern, with respective modulation symbols of the multiple component signals thereby having the same density and position in time, and wherein each rank-one tensor is constrained according to said common time-domain spreading pattern.

3. The method of claim 2, wherein the multiple component signals have also been spread with a common time-domain spreading sequence, and wherein each rank-one tensor is also constrained according to said common time-domain spreading sequence.

4. The method of claim 1, wherein each component signal has been spread with time-domain spreading sequences, frequency-domain spreading sequences, or both that vary over time according to a time-hopping pattern, and wherein each rank-one tensor is constrained according to said time-hopping pattern.

5. The method of claim 1, wherein alternating between fitting different unfolded representations of the constrained tensor model comprises alternating between adapting different component matrices of the model, adapting any given component matrix based on knowledge or estimates of other component matrices and based on a first constraint matrix that remains fixed according to said spreading of the component signals over time.

6. The method of claim 5, wherein said component matrices include an effective symbol matrix that contains modulation symbols of the component signals, a channel matrix that contains coefficients of the wireless channel for the component signals as received using the multiple diversity branches, and a coding matrix that contains at least some known frequency-domain spreading sequences for the component signals, and wherein the first constraint matrix models the correlation of the modulation symbols in the effective symbol matrix over time.

7. The method of claim 5, wherein the multiple component signals have been spread with a common time-domain spreading pattern, with respective modulation symbols of the multiple component signals thereby having the same density and position in time, and wherein the first constraint matrix remains fixed according to said common time-domain spreading pattern.

8. The method of claim 5, wherein receiving the composite signal comprises receiving the composite signal over multiple time slots, each component signal having been spread with different frequency-domain spreading sequences in different time slots, and wherein adapting any given component matrix is further based on a second constraint matrix that remains fixed according to said spreading of each component signal with different frequency-domain spreading sequences in different time slots.

9. The method of claim 8, wherein any given frequency-domain spreading sequence comprises one of a plurality of base sequences rotated by one of a plurality of phase rotations, wherein the composite signal comprises an Orthogonal Frequency-Division Multiplexing (OFDM) signal, with a time slot including multiple OFDM symbol intervals, wherein across time slots each component signal has been spread with different frequency-domain spreading sequences that comprise different base sequences, wherein across the OFDM symbol intervals of any given time slot each component signal has been spread with different frequency-domain spreading sequences that comprise the same base sequence rotated by different phase rotations, and wherein adapting any given component matrix is based on a second constraint matrix that remains fixed according to said spreading of each component signal across time slots and a third constraint matrix that remains fixed according to said spreading of each component signal across the OFDM symbol intervals of any given time slot.

10. The method of claim 9, wherein each component signal has been spread with different time-domain spreading sequences in different time slots, and wherein the third constraint matrix remains fixed also according to said spreading of each component signal with different time-domain spreading sequences in different time slots.

11. The method of claim 9, wherein adapting any given component matrix is further based on a fourth constraint matrix that models the coherence time of the wireless channel as being approximately equal to a time slot.

12. The method of claim 1, wherein arranging samples of the composite signal along time, frequency, and diversity dimensions to obtain a composite signal tensor comprises:
receiving samples of the composite signal in time from each diversity branch;
generating samples of the composite signal in frequency by converting the time samples into the frequency domain; and
stacking the time and frequency samples received from each diversity branch along time, frequency, and diversity dimensions.

13. The method of claim 1, wherein the receiver is associated with one of a plurality of cells in a wireless communication system, wherein the multiple component signals include desired component signals originating from the cell associated with the receiver as well as interfering component signals originating from one or more other cells, and wherein the method further comprises receiving control signaling from the one or more other cells that indicates the number of interfering component signals and frequency-domain spreading sequences used to spread those signals.

14. The method of claim 1, wherein the receiver comprises the receiver of a base station in a Long Term Evolution (LTE) system, and wherein the multiple component signals comprise uplink control signals received from multiple mobile terminals on a Physical Uplink Control Channel (PUCCH).

15. A receiver configured to separate multiple component signals carried in a composite signal that have been spread over time and frequency, the receiver comprising:
multiple diversity branches configured to receive the composite signal over a wireless channel;
a tensor generation circuit configured to arrange samples of the composite signal along time, frequency, and diversity dimensions to obtain a composite signal tensor; and
a set of cascaded least squares estimators configured to separate the component signals by fitting a constrained tensor model of the composite signal to the composite signal tensor in an alternating least squares estimation process, alternating during any given iteration of the process between fitting different unfolded representations of the constrained tensor model to corresponding unfolded representations of the composite signal tensor, wherein the constrained tensor model models the composite signal as a linear combination of multiple rank-one tensors associated respectively with the multiple component signals, each rank-one tensor being constrained according to the spreading of the associated component signal over time.

16. The receiver of claim 15, wherein the multiple component signals have been spread with a common time-domain spreading pattern, with respective modulation symbols of the multiple component signals thereby having the same density and position in time, and wherein each rank-one tensor is constrained according to said common time-domain spreading sequence.

17. The receiver of claim 15, wherein the multiple component signals have also been spread with a common time-domain spreading sequence, and wherein each rank-one tensor is also constrained according to said common time-domain spreading sequence.

18. The receiver of claim 15, wherein each component signal has been spread with time-domain spreading sequences, frequency-domain spreading sequences, or both that vary over time according to a time-hopping pattern, and wherein each rank-one tensor is constrained according to said time-hopping pattern.

19. The receiver of claim 15, wherein the set of cascaded least squares estimators is configured to alternate between fitting different unfolded representations of the constrained tensor model by alternating between adapting different component matrices of the model, adapting any given component matrix based on knowledge or estimates of other component matrices and based on a first constraint matrix that remains fixed according to said spreading of the component signals over time.

20. The receiver of claim 19, wherein said component matrices include an effective symbol matrix that contains modulation symbols of the component signals, a channel matrix that contains coefficients of the wireless channel for the component signals as received using the multiple diversity branches, and a coding matrix that contains at least some known frequency-domain spreading sequences for the component signals, and wherein the first constraint matrix models the correlation of the modulation symbols in the effective symbol matrix over time.

21. The receiver of claim 19, wherein the multiple component signals have been spread with a common time-domain spreading pattern, with respective modulation symbols of the multiple component signals thereby having the same density and position in time, and wherein the first constraint matrix remains fixed according to said common time-domain spreading pattern.

22. The receiver of claim 19, wherein the multiple diversity branches are configured to receive the composite signal over multiple time slots, each component signal having been spread with different frequency-domain spreading sequences in different time slots, and wherein the set of cascaded least squares estimators is configured to adapt any given component matrix further based on a second constraint matrix that remains fixed according to said spreading of each component.

23. The receiver of claim 22, wherein any given frequency-domain spreading sequence comprises one of a plurality of base sequences rotated by one of a plurality of phase rotations, wherein the composite signal comprises an Orthogonal Frequency-Division Multiplexing (OFDM) signal, with a time slot including multiple OFDM symbol intervals, wherein across time slots each component signal has been spread with different frequency-domain spreading sequences that comprise different base sequences, wherein across the OFDM symbol intervals of any given time slot each component signal has been spread with different frequency-domain spreading sequences that comprise the same base sequence rotated by different phase rotations, and wherein the set of cascaded least squares estimators is configured to adapt any given component matrix based on a second constraint matrix that remains fixed according to said spreading of each component signal across time slots and a third constraint matrix that remains fixed according to said spreading of each component signal across the OFDM symbol intervals of any given time slot.

24. The receiver of claim 23, wherein each component signal has been spread with different time-domain spreading sequences in different time slots, and wherein the third constraint matrix remains fixed also according to said spreading of each component signal with different time-domain spreading sequences in different time slots.

25. The receiver of claim 23, wherein the set of cascaded least squares estimators is configured to adapt any given component matrix further based on a fourth constraint matrix that models the coherence time of the wireless channel as being approximately equal to a time slot.

26. The receiver of claim 15, wherein the tensor generation circuit is configured to:
 receive samples of the composite signal in time from each diversity branch;
 generate samples of the composite signal in frequency by converting the time samples into the frequency domain; and
 stack the time and frequency samples received from each diversity branch along time, frequency, and diversity dimensions.

27. The receiver of claim 15, wherein the receiver is associated with one of a plurality of cells in a wireless communication system, wherein the multiple component signals include desired component signals originating from the cell associated with the receiver as well as interfering component signals originating from one or more other cells, and wherein the receiver is configured to receive control signaling from the one or more other cells that indicates the number of interfering component signals and frequency-domain spreading sequences for those signals.

28. The receiver of claim 15, wherein the receiver comprises the receiver of a base station in a Long Term Evolution (LTE) system, and wherein the multiple component signals comprise uplink control signals received from multiple mobile terminals on a Physical Uplink Control Channel (PUCCH).

* * * * *

UNITED STATES PATENT AND TRADEMARK OFFICE
CERTIFICATE OF CORRECTION

PATENT NO. : 8,369,468 B2
APPLICATION NO. : 12/917126
DATED : February 5, 2013
INVENTOR(S) : da Silva et al.

It is certified that error appears in the above-identified patent and that said Letters Patent is hereby corrected as shown below:

In the Specifications:

In Column 10, Line 28, delete "$V_1$, $V_1$, and $V_1$" and insert -- $V_1$, $V_2$, and $V_3$ --, therefor.

In Column 14, Line 25, in Equation (29), delete "$\hat{W}_{(i=0)} = [W(1) \ldots W(q)_{(i=0)} \ldots \hat{W}(Q)_{(i=0)}].$" and insert -- $\hat{\mathbf{W}}_{(i=0)} = \left[ \mathbf{W}(1) \ldots \hat{\mathbf{W}}(q)_{(i=0)} \ldots \hat{\mathbf{W}}(Q)_{(i=0)} \right].$ --, therefor.

Signed and Sealed this
Twenty-third Day of July, 2013

Teresa Stanek Rea
*Acting Director of the United States Patent and Trademark Office*